United States Patent
Fowler et al.

(10) Patent No.: US 11,195,126 B2
(45) Date of Patent: *Dec. 7, 2021

(54) EFFICIENCY ENHANCEMENTS IN TASK MANAGEMENT APPLICATIONS

(71) Applicant: Microsoft Technology Licensing, LLC, Redmond, WA (US)

(72) Inventors: Chad Fowler, Memphis, TN (US); Benjamen Ljudmilov Mateev, Berlin (DE)

(73) Assignee: Microsoft Technology Licensing, LLC, Redmond, WA (US)

(*) Notice: Subject to any disclaimer, the term of this patent is extended or adjusted under 35 U.S.C. 154(b) by 423 days.

This patent is subject to a terminal disclaimer.

(21) Appl. No.: 15/450,714

(22) Filed: Mar. 6, 2017

(65) Prior Publication Data
US 2018/0129993 A1 May 10, 2018

Related U.S. Application Data

(60) Provisional application No. 62/418,268, filed on Nov. 6, 2016.

(51) Int. Cl.
*G06Q 10/06* (2012.01)
*G06Q 10/10* (2012.01)
(Continued)

(52) U.S. Cl.
CPC ... *G06Q 10/063116* (2013.01); *G06F 3/0482* (2013.01); *G06Q 10/06311* (2013.01);
(Continued)

(58) Field of Classification Search
None
See application file for complete search history.

(56) References Cited

U.S. PATENT DOCUMENTS

| 5,394,549 A | 2/1995 | Stringfellow et al. |
| 6,898,622 B1 | 5/2005 | Malik |
| (Continued) | | |

FOREIGN PATENT DOCUMENTS

| CN | 101395567 A | 3/2009 |
| CN | 102147898 | 8/2011 |
| (Continued) | | |

OTHER PUBLICATIONS

"Chinese 1st Office Action in Application 201380065593.3, dated Jun. 14, 2017, 15 pgs. (337078-CN-PCT)".
(Continued)

*Primary Examiner* — Stephanie Z Delich

(57) ABSTRACT

Efficiency improvements for electronic task managers and an improved user experience are realized when more relevant and fewer irrelevant tasks are presented to users and users are given greater control in manipulating those task items. By heuristically determining times, locations, and semantics associated with task relevance and integrating the management of tasks into more applications, the functionality of the systems providing for electronic task management is improved, as computer resources are spent with greater utility to the users and the user experience is improved for the users.

20 Claims, 23 Drawing Sheets

(51) Int. Cl.
*G06F 3/0482* (2013.01)
*G06F 16/9032* (2019.01)
*G06F 40/30* (2020.01)
*G06F 3/0484* (2013.01)
*G06F 9/451* (2018.01)
*G06F 3/0481* (2013.01)

(52) U.S. Cl.
CPC . *G06Q 10/06312* (2013.01); *G06Q 10/06314* (2013.01); *G06Q 10/109* (2013.01); *G06Q 10/1093* (2013.01); *G06Q 10/1095* (2013.01); *G06Q 10/1097* (2013.01); *G06F 3/0484* (2013.01); *G06F 3/04817* (2013.01); *G06F 9/453* (2018.02); *G06F 16/90324* (2019.01); *G06F 40/30* (2020.01)

(56) References Cited

U.S. PATENT DOCUMENTS

| | | |
|---|---|---|
| 6,959,166 B1 | 10/2005 | Gabai et al. |
| 7,016,855 B2 | 3/2006 | Eaton et al. |
| 7,035,901 B1 | 4/2006 | Kumagai et al. |
| 7,233,229 B2 | 6/2007 | Stroupe et al. |
| 7,349,920 B1 | 3/2008 | Feinberg et al. |
| 7,363,294 B2 | 4/2008 | Billsus et al. |
| 7,543,237 B2 | 6/2009 | Kontny et al. |
| 7,548,895 B2 | 6/2009 | Pulsipher et al. |
| 7,685,414 B1 | 3/2010 | Appenzeller et al. |
| 7,773,377 B2 | 8/2010 | Feague et al. |
| 7,817,796 B1 | 10/2010 | Clippinger et al. |
| 7,941,761 B2 | 5/2011 | Hally et al. |
| 8,069,422 B2 | 11/2011 | Sheshagiri et al. |
| 8,185,427 B2 | 5/2012 | Messer et al. |
| 8,185,944 B2 | 5/2012 | Schnackenberg et al. |
| 8,201,176 B2 | 6/2012 | Tatsubori et al. |
| 8,375,320 B2 | 2/2013 | Kotler et al. |
| 8,528,059 B1 | 9/2013 | Labana et al. |
| 8,560,371 B2 | 10/2013 | Levitt et al. |
| 8,587,793 B2 | 11/2013 | Naito et al. |
| 8,949,275 B1 | 2/2015 | Aasuri-Maringanti |
| 8,990,143 B2 | 3/2015 | Hohndel et al. |
| 9,008,631 B2 | 4/2015 | Small et al. |
| 9,111,291 B2 | 8/2015 | Lempel et al. |
| 9,122,542 B1 | 9/2015 | Nelissen |
| 9,313,162 B2 | 4/2016 | Kumar et al. |
| 9,460,422 B2 | 10/2016 | Reter et al. |
| 9,658,872 B1 | 5/2017 | Hanna |
| 9,832,149 B2 | 11/2017 | Uraizee et al. |
| 2002/0010746 A1 | 1/2002 | Jilk, Jr. et al. |
| 2002/0061741 A1 | 5/2002 | Leung et al. |
| 2003/0220937 A1 | 11/2003 | Maeoka et al. |
| 2004/0059712 A1 | 3/2004 | Dean et al. |
| 2004/0230636 A1* | 11/2004 | Masuoka ............... G06F 9/451 708/800 |
| 2004/0249709 A1 | 12/2004 | Donovan et al. |
| 2005/0108074 A1 | 5/2005 | Bloechl et al. |
| 2005/0132010 A1 | 6/2005 | Muller |
| 2005/0192992 A1 | 9/2005 | Reed et al. |
| 2005/0267770 A1 | 12/2005 | Banavar et al. |
| 2005/0268303 A1 | 12/2005 | Anderson et al. |
| 2005/0268306 A1 | 12/2005 | Anspach et al. |
| 2005/0289470 A1 | 12/2005 | Pabla et al. |
| 2006/0069599 A1 | 3/2006 | Hatoun et al. |
| 2006/0069666 A1 | 3/2006 | Burke et al. |
| 2006/0149677 A1 | 7/2006 | Shahine et al. |
| 2006/0282298 A1 | 12/2006 | Azvine et al. |
| 2007/0027732 A1 | 2/2007 | Hudgens |
| 2007/0244736 A1 | 10/2007 | Johnson |
| 2008/0005108 A1 | 1/2008 | Ozzie et al. |
| 2008/0005168 A1 | 1/2008 | Huff et al. |
| 2008/0034315 A1 | 2/2008 | Langoulant et al. |
| 2008/0086640 A1 | 4/2008 | Voss et al. |
| 2008/0126961 A1 | 5/2008 | Naaman et al. |
| 2008/0178110 A1 | 7/2008 | Hill et al. |
| 2008/0256061 A1 | 10/2008 | Chang et al. |
| 2009/0025013 A1 | 1/2009 | Hattori |
| 2009/0089133 A1 | 4/2009 | Johnson et al. |
| 2009/0094623 A1 | 4/2009 | Chakra et al. |
| 2009/0111425 A1 | 4/2009 | Forbes et al. |
| 2009/0150761 A1 | 6/2009 | Sawicki et al. |
| 2009/0239552 A1 | 9/2009 | Churchill et al. |
| 2009/0254824 A1 | 10/2009 | Singh |
| 2010/0031198 A1 | 2/2010 | Zimmerman et al. |
| 2010/0037222 A1 | 2/2010 | Tatsubori et al. |
| 2010/0125548 A1 | 5/2010 | Anzai et al. |
| 2010/0131961 A1 | 5/2010 | Palmieri |
| 2010/0169176 A1 | 7/2010 | Turakhia |
| 2010/0223575 A1 | 9/2010 | Leukart et al. |
| 2010/0257015 A1 | 10/2010 | Molander |
| 2010/0287320 A1 | 11/2010 | Querol et al. |
| 2011/0045841 A1 | 2/2011 | Kuhlke et al. |
| 2011/0131285 A1 | 6/2011 | Liao et al. |
| 2011/0145823 A1 | 6/2011 | Rowe et al. |
| 2011/0219433 A1 | 9/2011 | Albrecht-buehler |
| 2011/0276396 A1 | 11/2011 | Rathod |
| 2011/0276896 A1 | 11/2011 | Lambetti et al. |
| 2011/0283230 A1 | 11/2011 | Gnanasambandam et al. |
| 2011/0313803 A1 | 12/2011 | Friend et al. |
| 2012/0095815 A1 | 4/2012 | Glaser |
| 2012/0117058 A1 | 5/2012 | Rubinstein et al. |
| 2012/0144281 A1 | 6/2012 | Schechter et al. |
| 2012/0159536 A1 | 6/2012 | Treacy et al. |
| 2012/0173520 A1 | 7/2012 | Wu et al. |
| 2012/0179706 A1 | 7/2012 | Hobbs et al. |
| 2012/0191694 A1 | 7/2012 | Gardiol et al. |
| 2012/0197977 A1 | 8/2012 | Nagasaka et al. |
| 2012/0221384 A1 | 8/2012 | Avadhanam et al. |
| 2012/0221975 A1 | 8/2012 | Juristovski et al. |
| 2012/0223890 A1 | 9/2012 | Borovsky et al. |
| 2012/0242482 A1 | 9/2012 | Elumalai et al. |
| 2012/0253916 A1 | 10/2012 | Ayloo |
| 2012/0266174 A1 | 10/2012 | Inoue |
| 2012/0278120 A1 | 11/2012 | Insko et al. |
| 2012/0278821 A1 | 11/2012 | Tran et al. |
| 2012/0311585 A1 | 12/2012 | Gruber et al. |
| 2012/0330702 A1 | 12/2012 | Kowalski et al. |
| 2013/0006689 A1 | 1/2013 | Kinnear et al. |
| 2013/0091453 A1 | 4/2013 | Kotler et al. |
| 2013/0117208 A1 | 5/2013 | Dousse et al. |
| 2013/0218985 A1 | 8/2013 | Thazhmon et al. |
| 2013/0268507 A1 | 10/2013 | Macbeth et al. |
| 2013/0275429 A1* | 10/2013 | York .................... G06Q 50/01 707/737 |
| 2013/0282755 A1 | 10/2013 | Procopio et al. |
| 2013/0311285 A1 | 11/2013 | Abrol et al. |
| 2013/0311997 A1 | 11/2013 | Gruber et al. |
| 2013/0318473 A1 | 11/2013 | Van Os et al. |
| 2013/0346247 A1 | 12/2013 | Bash et al. |
| 2013/0346981 A1 | 12/2013 | Johnson et al. |
| 2014/0033071 A1 | 1/2014 | Gruber et al. |
| 2014/0081690 A1 | 3/2014 | Winters |
| 2014/0082521 A1 | 3/2014 | Carolan et al. |
| 2014/0089822 A1 | 3/2014 | Wu et al. |
| 2014/0101599 A1 | 4/2014 | Gandhi et al. |
| 2014/0130060 A1 | 5/2014 | Pope et al. |
| 2014/0172986 A1 | 6/2014 | Kumar et al. |
| 2014/0173602 A1 | 6/2014 | Kikin-Gil et al. |
| 2014/0173625 A1 | 6/2014 | Kumar et al. |
| 2014/0278513 A1 | 9/2014 | Prakash et al. |
| 2014/0317027 A1 | 10/2014 | Elumalai et al. |
| 2014/0337175 A1 | 11/2014 | Katzin et al. |
| 2014/0365951 A1 | 12/2014 | Fernandes et al. |
| 2015/0006564 A1 | 1/2015 | Tomkins et al. |
| 2015/0095268 A1 | 4/2015 | Greenzeiger et al. |
| 2015/0100503 A1 | 4/2015 | Lobo et al. |
| 2015/0112985 A1 | 4/2015 | Roggero et al. |
| 2015/0118672 A1 | 4/2015 | Yeskel et al. |
| 2015/0242091 A1 | 8/2015 | Lu et al. |
| 2015/0269508 A1 | 9/2015 | Damboritz et al. |
| 2015/0317582 A1 | 11/2015 | Nath et al. |
| 2016/0071064 A1 | 3/2016 | Itani et al. |
| 2016/0086116 A1 | 3/2016 | Rao et al. |
| 2016/0094499 A1 | 3/2016 | Uraizee et al. |

(56) References Cited

U.S. PATENT DOCUMENTS

| | | | |
|---|---|---|---|
| 2016/0161280 A1 | 6/2016 | Shahine et al. | |
| 2016/0180279 A1 | 6/2016 | Koerner et al. | |
| 2016/0203143 A1 | 7/2016 | Kritt et al. | |
| 2016/0219003 A1 | 7/2016 | Kumar et al. | |
| 2016/0350367 A1* | 12/2016 | Fischer | G06F 16/256 |
| 2016/0379175 A1 | 12/2016 | Bhattacharya et al. | |
| 2017/0193835 A1 | 7/2017 | Bonney-ache et al. | |
| 2020/0065139 A1 | 2/2020 | Kumar et al. | |
| 2020/0394595 A1 | 12/2020 | Fowler et al. | |
| 2021/0103878 A1 | 4/2021 | Fowler et al. | |

FOREIGN PATENT DOCUMENTS

| | | |
|---|---|---|
| CN | 102253860 | 11/2011 |
| CN | 102521317 A | 6/2012 |
| CN | 102737303 | 10/2012 |
| JP | 2000-029945 | 1/2000 |
| KR | 20120120316 A | 11/2012 |
| RU | 2392663 C2 | 6/2010 |
| RU | 2395841 C2 | 7/2010 |
| RU | 2591171 C2 | 7/2016 |
| WO | 9742568 A1 | 11/1997 |
| WO | 2010010967 A1 | 1/2010 |
| WO | 2012/167168 | 12/2012 |

OTHER PUBLICATIONS

"European Extended Search Report in Application 13818562.4, dated May 13, 2016, 8pgs. (337078-EP-EPT)".
"European Office Action in Application 13818562.4, dated Oct. 18, 2017, 8 pages. (337078-EP-EPT)".
Haas, et al., "CONTASK—Using Context-Sensitive Assistance to Improve Task-Oriented Knowledge Work", Proceedings of the 12th International Conference on Enterprise Information Systems, vol. 2, 10 pages (Jun. 8, 2010).".
"Japanese Office Action in Application 2015-547546, dated Aug. 28, 2017, 6 pages. (337078-JP-PCT)".
"PCT International Preliminary Report on Patentability in Application PCT/US2013/074697, dated Jun. 25, 2015, 7 Pages. (337078-WO-PCT)".
"PCT International Search Report & Written Opinion for Application PCT/US2013/074697, dated Jun. 30, 2014, 10 Pages. (337078-WO-PCT)".
"U.S. Appl. No. 13/715,434, Amendment and Response filed Dec. 26, 2014, 20 pages. (337078-US-NP)".
"U.S. Appl. No. 13/715,434, Amendment and Response filed Dec. 28, 2016, 16 pages. (337078-US-NP)".
"U.S. Appl. No. 13/715,434, Amendment and Response filed Apr. 4, 2016, 14 pages. (337078-US-NP)".
"U.S. Appl. No. 13/715,434, Amendment and Response filed Aug. 24, 2015, 15 pages. (337078-US-NP)".
"U.S. Appl. No. 13/715,434, Office Action dated Nov. 3, 2015, 28 pages. (337078-US-NP)".
"U.S. Appl. No. 13/715,434, Office Action dated Feb. 8, 2017, 30 pages. (337078-US-NP)".
"U.S. Appl. No. 13/715,434, Office Action dated Apr. 22, 2015, 28 pages. (337078-US-NP)".
"U.S. Appl. No. 13/715,434, Office Action dated Jul. 28, 2016, 29 pages. (337078-US-NP)".
"U.S. Appl. No. 13/715,434, Office Action dated Aug. 27, 2014, 24 pages. (337078-US-NP)".
"U.S. Appl. No. 15/087,266, Office Action dated Feb. 14, 2018, 14 pages. (337678-US-CNT)".
"PCT International Search Report and Written Opinion Issued in PCT Application No. PCT/US2017/059633, dated Jan. 3, 2018, 12 Pages. (MS# 400919-WO-PCT)".
"PCT International Search Report and Written Opinion Issued in PCT Application No. PCT/US2017/059634, dated Jan. 3, 2018, 12 Pages. (MS# 400918-WO-PCT)".

Dey, et al., "CybreMinder: A Context-Aware System for Supporting Reminders", In Proceedings of 2nd international symposium on Handheld and Ubiquitous Computing, Sep. 25, 2000, pp. 172-186.
Dey, et al., "Towards a Better Understanding of Context and Context-Awareness", In Proceedings of 1st international symposium on Handheld and Ubiquitous Computing, Sep. 27, 1999, 12 pages.
"Identify the Context", In Journal of IEEE Professional Communication Society, Apr. 11, 2016, 3 pages.
Lida, et al., "Breadcrumb Navigation: An Exploratory Study of Usage", http://usabilitynews.org/breadcrumb-navigation-an-exploratory-study-of-usage/, Published on: Feb. 11, 2003, 6 pages.
"1Calendar", http://1calendar.appappeal.com/, Published on: Aug. 17, 2011, 12 pages.
Bellotti et al., "Taking Email to Task: The Design and Evaluation of a Task Management Centered Email Tool", In Proceedings of the SIGCHI Conference on Human Factors in Computing Systems, Apr. 5, 2003, 8 pages.
Dube, Ryan, "Coolendar—A Cool Calendar & To-Do List In One", http://www.makeuseof.com/tag/coolendar-calendar-todo-list/, Published on: Sep. 7, 2011, 7 pages.
Martin, James A., "'Handle' iOS App Mercifully Merges Email, Calendars and Tasks", http://www.cio.com/article/2875912/mobile-apps/handle-ios-app-mercifully-merges-email-calendars-and-tasks.html, Published on: Jan. 27, 2015, 3 pages.
Matteson, Scott, "Organize your Gmail Tasks using the GTasks application", http://www.techrepublic.com/blog/google-in-the-enterprise/organize-your-gmail-tasks-using-the-gtasks-application/, Published on: Apr. 12, 2013, 28 pages.
Miles, Stephanie, "Coolendar—A Better Way to Plan Ahead", http://www.appvita.com/2011/09/15/coolendar-online-scheduling-and-appointment/, Published on: Sep. 15, 2011, 3 pages.
"Remember the Milk", https://play.google.com/store/apps/details?id=com.rememberthemilk.MobileRTM&hl=en, Published on: Aug. 29, 2016, 3 pages.
"Task Management Made Delightfully Simple", https://hitask.com/, Retrieved on: Nov. 10, 2016, 5 pages.
"Ticktick—Your Lightweight Task Manager", https://ticktick.com/, Retrieved on: Nov. 10, 2016, 4 pages.
"Todoist", https://en.todoist.com/, Retrieved on: Nov. 10, 2016, 8 pages.
U.S. Appl. No. 15/450,521, filed Mar. 6, 2017 entitled "Efficiency Enhancements in Task Management Applications".
U.S. Appl. No. 15/450,758, filed Mar. 6, 2017 entitled "Efficiency Enhancements in Task Management Applications".
U.S. Appl. No. 15/450,825, filed Mar. 6, 2017 entitled "Efficiency Enhancements in Task Management Applications".
U.S. Appl. No. 15/450,874, filed Mar. 6, 2017 entitled "Efficiency Enhancements in Task Management Applications".
"Wunderlist—Keep your life in sync", https://www.wunderlist.com/, Retrieved on: Nov. 10, 2016, 5 pages.
"Wunderlist: To-Do List & Tasks", https://www.microsoft.com/en-in/store/p/wunderlist-to-do-list-tasks/9wzdncrdfxzs, Retrieved on: Nov. 10, 2016, 5 pages.
PCT International Search Report and Written Opinion Issued in PCT Application No. PCT/US2017/059812, dated Jan. 3, 2018, 12 Pages. (400921-WO-PCT).
"Analyzing Inter-Application Communication in Android", Erika Chine, Adrienne Porter Felt, Kate Greenwood and David Wagner, Aug. 21, 2012, Proceedings: Proceedings of the 9th International Conference on Mobile Systems, Applications, and Services, 14 pgs.
Keggstra, Greg, "Announcing the OpenID Backplane Protocol Work Group", Aug. 21, 2012, reprinted from the Internet at: http://openid.net/2012/08/21/announcing-the-open id-backplane-protocol-work-group/ , 8 pgs.
"AppContracts and Extensions" (Windows Store Apps), Oct. 15, 2012, reprinted from the Internet at: http://msdn.microsoft.com/en-us/library/windows/apps/hh464906.aspx, 4 pgs.
"IOS App Programming Guide", Sep. 19, 2012, reprinted from the Internet at: http://developer.apple.com/library/ios/documentation/iphone/conceptual/iphoneosprogrammingguide/iPhoneAppProgrammingGuide.pdf, 144 pgs.

(56) References Cited

OTHER PUBLICATIONS

Abrams, Lawrence, "Flow to open a file with a different program on your Mac", Bleepingcomputer.com, Oct. 1, 2011, 3 pgs.
Chinese Office Action in Application 201380065290.1, dated Sep. 8, 2017, 12 pages. (337933-CN-PCT).
Conder, Shane et al., "Quick Tip: Enabling Users to Send Email from Your Android Applications—The Easy Way", Jul. 13, 2010, 34 pgs.
Dunaway, Gavin, "Yahoo! Mail Beta Uses Email Keywords for Ad Targeting"—7 pages, Published Date: May 23, 2011, http://www.adotas.com/2011/05/yahoo-mail-beta-uses-email-keywords-for-ad-targeting/.
European Communication in Application 13821242.8, dated Jul. 21, 2015, 2 pgs. (337933-EP-EPT).
Hoffman, "An Introduction to Charms in Windows 8: What they are and How to Use them", obtained online at: http://www.howtogeek.com/114341/an-introduction-to-charms-in-windows-8-what-they-ar . . . , May 2012, 8 pages. (337933-US-NP).
Macmanus, Richard, "Gmail Ads Within Email Thread—Is This New?"—Published Date: Sep. 6, 2009, http://www.readwriteweb.com/archives/gmail_ads_within_email_thread_-_is_this_new.php, 2 pgs.
Ongtang, M. et al., "Semantically Rich Application-Centric Security in Android", The Pennsylvania State University, Dept. of Science and Engineering, 2009, 10 pages. (337933-US-NP).
PCT International Search Report cited in PCT Application No. PCT/US2013/075182 dated Mar. 18, 2014, 8 pgs.
Piggyback e-mail—Published Date: Feb. 11, 2005, http://www.webopedia.com/TERM/P/piggyback_e_mail.html, 2 pages.
U.S. Appl. No. 13/713,279, Amendment and Response filed Nov. 13, 2015, 11 pgs. (337678-US-NP).
U.S. Appl. No. 13/713,279, Amendment and Response filed Jul. 27, 2015, 12 pgs. (337678-US-NP).
U.S. Appl. No. 13/713,279, Notice of Allowance dated Dec. 7, 2015, 7 pgs. (337678-US-NP).
U.S. Appl. No. 13/713,279, Office Action dated Mar. 25, 2015, 18 pgs. (337678-US-NP).
U.S. Appl. No. 13/713,279, Office Action dated Aug. 13, 2015, 7 pgs. (337678-US-NP).
U.S. Appl. No. 13/713,375, Amendment and Response filed Dec. 22, 2016, 16 pgs. (337933-US-NP).
U.S. Appl. No. 13/713,375, Amendment and Response filed Mar. 15, 2016, 13 pgs. (337933-US-NP).
U.S. Appl. No. 13/713,375, Amendment and Response filed Apr. 6, 2015, 15 pgs. (337933-US-NP).
U.S. Appl. No. 13/713,375, Amendment and Response filed May 19, 2017, 18 pages. (337933-US-NP).
U.S. Appl. No. 13/713,375, Amendment and Response filed Sep. 8, 2015, 13 pgs. (337933-US-NP).
U.S. Appl. No. 13/713,375, Office Action dated Jan. 19, 2017, 16 pgs. (337933-US-NP).
U.S. Appl. No. 13/713,375, Office Action dated Oct. 15, 2015, 17 pgs. (337933-US-NP).
U.S. Appl. No. 13/713,375, Office Action dated Nov. 5, 2014, 16 pgs. (337933-US-NP).
U.S. Appl. No. 13/713,375, Office Action dated Jun. 24, 2016, 18 pgs. (337933-US-NP).
U.S. Appl. No. 13/713,375, Office Action dated Jun. 25, 2015, 16 pgs. (337933-US-NP).
U.S. Appl. No. 13/713,375, Office Action dated Jul. 28, 2017, 17 pages. (337933-US-NP).
U.S. Appl. No. 15/087,266, Office Action dated Aug. 18, 2017, 13 pages. (337678-US-CNT).
Williams, Ty, "Setting up payment options in BlackBerry App World", Apr. 2011, obtained online at: http://helpblog.blackberry.com/2011/04/app-world-payment-options/, 4 pages. (337933-US-NP).
Japanese Notice of Rejection in Application 2015-548021, dated Oct. 20, 2017, 4 pgs. (337933-JP-PCT).
U.S. Appl. No. 15/087,266, Amendment and Response filed Jan. 17, 2018, 13 pages. (337678-US-CNT).
U.S. Appl. No. 13/713,375, Amendment and Response filed Nov. 28, 2017, 14 pages. (337933-US-NP).
U.S. Appl. No. 13/713,375, Office Action dated Dec. 29, 2017, 15 pages. (337933-US-NP).
"Final Office Action Issued in U.S. Appl. No. 13/713,375", dated Jul. 11, 2018, 16 Pages.
"Second Office Action Issued in Chinese Patent Application No. 201380065290.1", dated May 3, 2018, 5 Pages.
"Second Office Action Issued in Chinese Patent Application No. 201380065593.3", dated Apr. 10, 2018, 11 pages.
Dixa, et al., "From the Web of Data to a World of Action", In Proceedings of the Journal of the Web Semantics: Science, Services and Agents on the World Wide Web, vol. 8, Issue 4, Nov. 1, 2010, 15 Pages.
"International Search Report and Written Opinion Issued in PCT Application No. PCT/US2017/059636", dated Jan. 8, 2018, 10 Pages.
"Non Final Office Action Issued in U.S. Appl. No. 13/713,375", dated Feb. 26, 2019, 15 Pages. (MS# 337933-US-NP).
"Final Office Action Issued in U.S. Appl. No. 15/450,874", dated Feb. 7, 2019, 22 Pages. (MS# 401510-US-NP).
"Non Final Office Action Issued in U.S. Appl. No. 15/450,874", dated Sep. 21, 2018, 24 Pages. (MS# 401510-US-NP).
U.S. Appl. No. 13/713,375, Amendment and Response filed Mar. 29, 2018, 14 pages. (337933-US-NP).
U.S. Appl. No. 13/713,375, Supplemental Amendment and Response filed Mar. 30, 2018, 14 pages. (337933-US-NP).
"Notice of Allowance Issued in U.S. Appl. No. 13/713,375", dated Jul. 15, 2019, 9 Pages. (MS# 337933-US-NP).
"Non-Final Office Action Issued in U.S. Appl. No. 15/450,521", dated May 31, 2019, 18 Pages. (MS# 400918-US-NP).
"Non Final Office Action Issued in U.S. Appl. No. 15/450,758", dated Jun. 21, 2019, 13 Pages. (MS# 400920-US-NP).
"Non Final Office Action Issued in U.S. Appl. No. 15/450,825", dated Jun. 19, 2019, 16 Pages. (MS# 400921-US-NP).
"Non Final Office Action Issued in U.S. Appl. No. 15/450,874", dated Apr. 29, 2019, 39 Pages. (MS# 401510-US-NP).
"Final Office Action Issued in U.S. Appl. No. 15/450,825", dated Dec. 11, 2019, 9 Pages. (MS# 400921-US-NP).
"Final Office Action Issued in U.S. Appl. No. 15/450,758", dated Dec. 10, 2019, 11 Pages. (MS# 400920-US-NP).
"Final Office Action Issued in U.S. Appl. No. 15/450,874", dated Nov. 5, 2019, 21 Pages. (MS# 401510-US-NP).
"Final Office Action Issued in U.S. Appl. No. 15/450,521", dated Dec. 10, 2019, 20 Pages. (MS# 400918-US-NP).
"Office Action Issued in Korean Patent Application No. 10-2015-7015552", dated Dec. 4, 2019, 10 Pages (MS# 337933-KR-PCT).
"Office Action Issued in European Patent Application No. 13821242.8", dated Nov. 6, 2019, 8 Pages. (MS# 337933-EP-EPT).
"Non Final Office Action Issued in U.S. Appl. No. 15/450,521", dated Mar. 18, 2020, 8 Pages. (MS# 400918-US-NP).
"Non Final Office Action Issued in U.S. Appl. No. 15/450,758", dated Mar. 18, 2020, 9 Pages. (MS# 400920-US-NP).
"Non Final Office Action Issued in U.S. Appl. No. 15/450,874", dated Mar. 20, 2020, 18 Pages. (MS# 401510-US-NP).
"Notice of Allowance Issued in Korean Patent Application No. 10-2015-7015552", dated May 18, 2020, 4 Pages. (MS# 337933-KR-PCT).
"Office Action Issued in Chile Patent Application No. 201901127", dated May 15, 2020, 15 Pages. (MS# 400921-CL-PCT).
"Final Office Action Issued in U.S. Appl. No. 15/450,521", dated Jul. 6, 2020, 12 Pages. (MS# 400918-US-NP).
"Final Office Action Issued in U.S. Appl. No. 15/450,758", dated Jul. 6, 2020, 13 Pages. (MS# 400920-US-NP).
"Final Office Action Issued in U.S. Appl. No. 15/450,874", dated Jul. 7, 2020, 18 Pages. (MS# 401510-US-NP).
"Office Action Issued in European Patent Application No. 17801180.5", dated Jul. 9, 2020, 6 Pages. (MS# 400920-EP-EPT).
"Office Action Issued in European Patent Application No. 17798076.0", dated Jul. 9, 2020, 5 Pages. (MS# 400921-EP-EPT).

(56) References Cited

OTHER PUBLICATIONS

"Office Action Issued in European Patent Application No. 17798070. 3", dated Jul. 3, 2020, 6 Pages. (MS# 400919-EP-EPT).
"Office Action Issued in Colombian Patent Application No. NC2019/ 0004600", dated Jul. 28, 2020, 8 Pages. (MS# 400921-CO-PCT).
"Office Action Issued in Chile Patent Application No. 201901127", dated Aug. 17, 2020, 16 Pages. (MS# 400921-CL-PCT).
"Summon to Attend Oral Proceedings Issued in European Patent Application No. 13821242.8", dated Sep. 1, 2020, 10 Pages.
"Office Action Issued in Korean Patent Application No. 10-2020-7023304", dated Oct. 16, 2020, 11 Pages.
"Office Action Issued in European Patent Application No. 17798071. 1", dated Dec. 7, 2020, 6 Pages.
"Office Action Issued in Israel Patent Application No. 266342", dated Dec. 16, 2020, 9 Pages.
"Summons To Attend Oral Proceedings Issued in European Patent Application No. 17798076.0", dated Mar. 16, 2021, 9 Pages.
"Office Action and Search Report Issued in Russian Patent Application No. 2019112875", dated Feb. 16, 2021, 20 Pages.
"Office Action Issued in Thailand Patent Application No. 1901002737", dated Apr. 5, 2021, 3 Pages.
"Final Office Action Issued in U.S. Appl. No. 16/667,204", dated Apr. 14, 2021, 12 Pages.
"Office Action Issued in Indonesian Patent Application No. P00201903749", dated Apr. 6, 2021, 3 Pages.
"Notice of Allowance Issued in Russian Application No. 2019112875", dated Jun. 15, 2021, 30 Pages.
"Summons to Attend Oral Proceedings Issued in European Patent Application No. 17798070.3", dated Jul. 7, 2021, 8 Pages.
"Office Action Issued in Chile Patent Application No. 201901127", dated Jul. 26, 2021, 3 Pages.
"Summons to Attend Oral Proceedings Issued in European Patent Application No. 17801180.5", dated Sep. 2, 2021, 9 Pages.
"Summons to Attend Oral Proceedings Issued in European Patent Application No. 17798071.1", dated Sep. 2, 2021, 8 Pages.

* cited by examiner

| INBOX | | |
|---|---|---|
| +New mail | Search 🔍 ⟳ | ↶Reply ⤺Reply all ⤻Forward [○Task] ✕Delete |
| 👤Accounts | Inbox | |
| John's Email 137 | Sports channel | 👤 Joanna |
| John's Omail 7 | The XYZ Show Newsletter for 3.23.13 | |
| Photography Mail 2740 | The XYZ Show Newsletter for 3.23.13  2:29 pm | RE: The Tradition |
| | Rob Will, Environment | To: Joanna, Mark, Jim |
| | The next solar panel | |
| | Dear Cathy, this could be the next solar panel | Excellent- I agree. Could you register? If not, I'll try to remember to do so tonight |
| 📁FOLDERS | Kats, Jessica | |
| | RE: The Tradition | Sent from Mail |
| Inbox 2740 | Excellent- I agree. Could you register? If not, I'll | |
| Drafts 1 | Stella from T Company | From: Cathy |
| Sent mail | Get productive | Sent: Tuesday, March 22, 2016, 11:51 am |
| All Mail | #ReadySetGoal Bring some innovation into your | To:   Jeff, Cathy |
| More | | Subject: The Tradition |
| | Laying it all out special offers | |
| | Crochet Hooks | Hi Friends, |
| | Allcrochetpatterns.com is happy to announce | Looks like Volunteer registration is open for the May Sale! We'd like you to volunteer both nights |
| | Bed Bath Store | |
| | Closeout bedsheets 69.99 20% Off offer | |
| | Value Bedding shop now view as web page | |
| | | -Cathy |
| | Food Critics | |
| | Reached 100 followers | |
| | Hello food blogger, you have reached 100 foll | |

MOBILE COMPUTING DEVICE

EFFICIENCY ENHANCEMENTS IN TASK MANAGEMENT APPLICATIONS

CROSS-REFERENCES TO RELATED APPLICATIONS

The present disclosure claims priority to U.S. Provisional Patent Application No. 62/418,268 filed Nov. 6, 2016, the disclosure of which is hereby incorporated by reference in its entirety.

BACKGROUND

Electronic task management systems and applications enable users to track various tasks more efficiently than with hardcopy notes; users can access the same tasks from multiple devices, rearrange the tasks, and share tasks between users remotely. The ease of adding tasks to an electronic task manager, however, can leave users overwhelmed; too many, irrelevant, or contextually inappropriate tasks can distract the user from the tasks that are relevant to the user at a given time and place. The provision of unwanted tasks not only degrades the user experience, but also wastes computing resources that are used to provide tasks that are not wanted by the user that could be used more efficiently for other tasks.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Enhancements to the efficiency of a task management application are discussed herein in relation to systems, methods, and computer readable media that provide such enhancements. Relational data for entities and the context in which users interact with task items, including the productivity applications used to complete task items, are used to provide users with more relevant tasks, fewer irrelevant tasks, and with greater control and convenience in manipulating task items.

In one aspect, dynamic context is provided for tasks to provide the user with greater recall for details related to the task. The context in which the task item was created is provided in a traceable format for the user to interpret the origins of a task item. For example, a user with a task item for "call John Doe" may be provided with the entities that resulted in the need to "call John Doe," such as an email from John requesting a call, and details related to John, such as John's phone number, an image of John, etc. The dynamic context connects tasks to the reasons why they were created and resources for how they may be completed, and includes references for locations, times, persons, documents, and other entities relevant to the task items for the user's review.

By providing enhanced efficiency for a task management application, not only is the user's experience improved, but the functionality of the device used to provide the task management application is also improved. The device spends computing resources (processor cycles and memory storage space) with greater precision; wasting fewer resources to provide unwanted tasks for the user's consideration.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 6 illustrates an example graphical user interface in which Task List item creation from within a productivity application is shown;

FIG. 7 illustrates a graphical user interface in which a Task List is implemented;

FIG. 9 illustrates a graphical user interface in which a task application provides task list items in a task list category along with additional data about the selected task list item;

FIGS. 14A and 14B illustrate a graphical user interface in which a task assigned by a first user can be provided to a second user in the application relevant to completing that task item;

DETAILED DESCRIPTION

Figure 1:
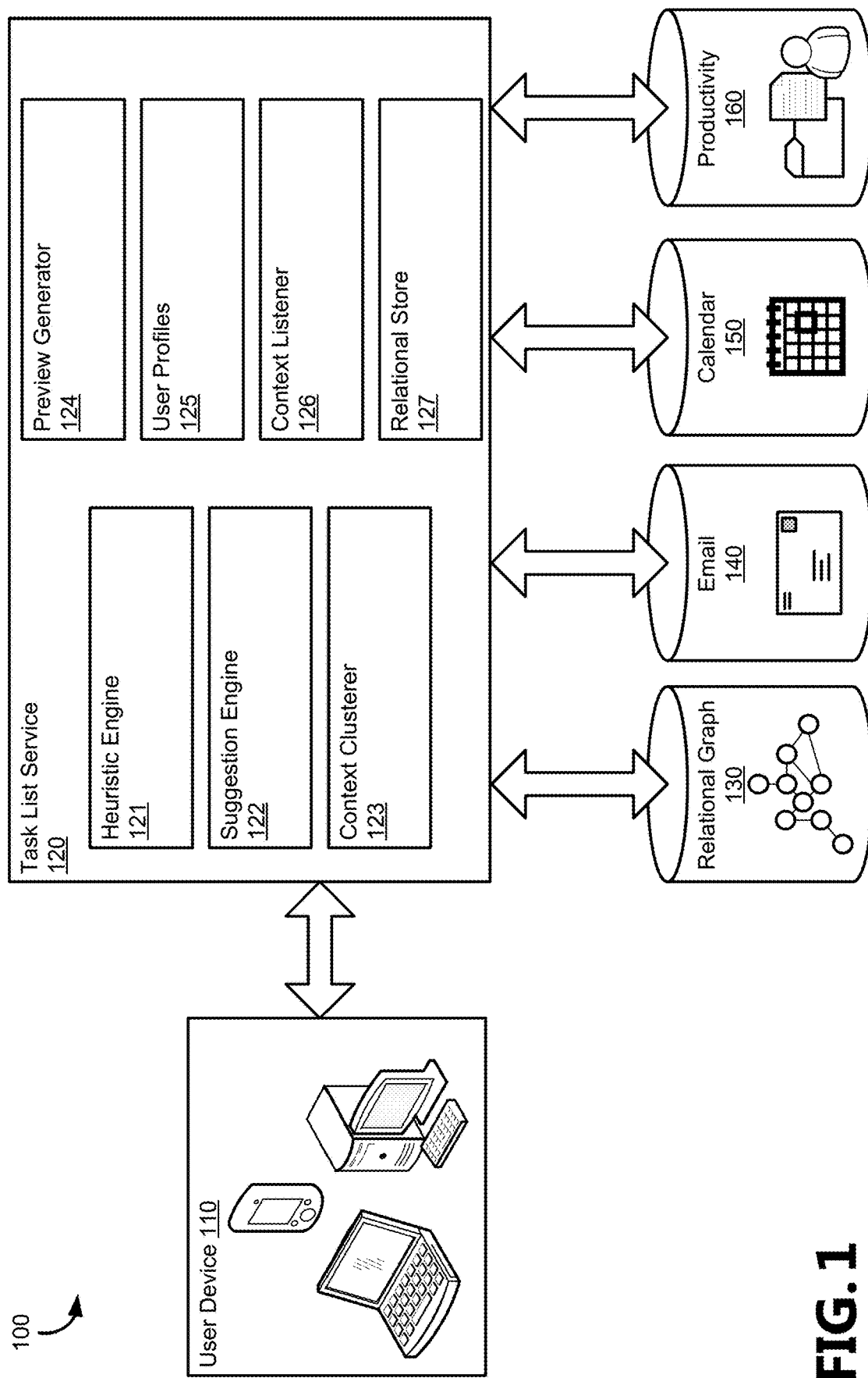
FIG. 1 illustrates an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Enhancements to the efficiency of a task management application are discussed herein in relation to systems, methods, and computer readable media that provide such enhancements. Relational data for entities and the context in which users interact with task items, including the productivity applications used to complete task items, are used to provide users with more relevant tasks, fewer irrelevant tasks, and with greater control and convenience in manipulating task items.

In one aspect, dynamic context is provided for tasks to provide the user with greater recall for details related to the task. The context in which the task item was created is provided in a traceable format for the user to interpret the origins of a task item. For example, a user with a task item for "call John Doe" may be provided with the entities that resulted in the need to "call John Doe," such as an email from John requesting a call, and details related to John, such as John's phone number, an image of John, etc. The dynamic context connects tasks to the reasons why they were created and resources for how they may be completed, and includes references for locations, times, persons, documents, and other entities relevant to the task items for the user's review.

By providing enhanced efficiency for a task management application, not only is the user's experience improved, but the functionality of the device used to provide the task management application is also improved. The device spends computing resources (processor cycles and memory storage space) with greater precision; wasting fewer resources to provide unwanted tasks for the user's consideration.

FIG. 1 illustrates an example operating environment 100 in which the present disclosure may be practiced. As illustrated, a user device 110 is in communication with a task list service 120. In various aspects, the task list service 120 is hosted on the user device 110, while in other aspects, the task list service 120 is hosted on a remote device as a service accessible by the user device 110. The task list service 120 includes in various configurations one or more of a: heuristic engine 121, a suggestion engine 122, a context clusterer 123, a preview generator 124, user profiles 125, a context listener 126, and a relational store 127. The task list service 120 is in further communication with one or more services that may be hosted on the user device 110 or another device that include, but are not limited to: a relational graph service 130, an email service 140, a calendar service 150, and a productivity service 160. Although only one of each component is illustrated in FIG. 1, it will be appreciated that in different aspects more than one of one or more components are provided (e.g., more than one user device 110 is in communication with the task list service 120, which is in communication with more than one email service 140).

Each of the user device 110, task list service 120, and the services 130-160 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 17, 18A, 18B, and 19. User devices 110 are operated by users, who may be humans or automated systems (e.g., "bots"). In various aspects, the user device 110, task list service 120, and the services 130-160 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The user device 110 is accessed by a user to operate a task list application, among other features and applications. The task list application provides user-specific tasks that the user wishes to be reminded of to complete and tools for manipulating those tasks (e.g., assign task to another user, share task with another user, complete task, mark status of task, add task, remove task). For example, a user may access the task list application to receive a reminder to pay rent on a given set of days, to attend a meeting at a given time, or to go grocery shopping at an undefined time. In various aspects, the task list application is provided by the task list service 120 in a thin client running on the user device 110 in conjunction with a client running on a remote server. In other aspects, the task list application is provided by a task list service 120 running on the user device 110 as a thick client. In yet other aspects, the task list service 120 operates as a distributed system, running on the user device 110 as a thick client when a network connection to the remote server is not available (or not needed) and as a thin client when the network connection is available.

The task list service 120 includes one or more components that may be enabled or disabled as users enable or disable features or network connections to a remote server are established or lost. In various aspects, a task list service 120 local to a given user device 110 may also disable or reduce in size or complexity one or more components compared to a task list service 120 that is accessible over a network by multiple user devices 110.

A heuristic engine 121 is operable to learn user behavior over time to enhance the determinations of which candidate tasks discovered from task sources are to be presented, and in what order, to a given user at a given time and location. The heuristic engine 121 is operable to use one or more machine learning approaches to determine how to best serve the needs and use-cases presented by individual users.

A suggestion engine 122 is operable to determine whether a candidate task received from a tasks source should be suggested to the user as a task to perform at a given time and/or location. From all of the candidate task items that may be presented to the user at any given time, the suggestion engine 122 filters those task items to a manageable subset based on the user's existing task items (to avoid scheduling conflicts), prior acceptances/rejections of suggested task items, and the prior actions of the user. For example, if a user's calendar includes an event for an upcoming birthday, a suggested task is created that the person whose birthday is coming up should be called prior to that date. In another example, where the user sent an email that included a promise to send an attachment by a deadline, a task is suggested to meet this deadline. In a further example, an important meeting is observed on the calendar service 150 as occurring on Friday, and the suggestion service 122 will observe the rest of the week's calendar to determine which days prior to the meeting are likely to allow for a task item to prepare for the important meeting. For example, the task item will be presented on Monday and Thursday, but not Tuesday or Wednesday, due to the number of task items already accepted for on those days (Tuesday and Wednesday being busier or having more task items accepted in the present example than Monday and Thursday).

A content clusterer 123 is operable to cluster tasks and entities that are related in the location, time, and semantics terms that they contain. As will be understood, clustering is a statistical operation that groups items based on shared characteristics (and combinations thereof). In one aspect, tasks interacted with (created/completed) with similar time ranges are clustered together based on similar time characteristics. In another aspect, tasks interacted with (created/completed) when the user is at a given location will be clustered together based on location characteristics. In a further aspect, tasks with similar words, terms, or entities (persons, documents, resources) will be clustered together based on semantic characteristics. For example, the content clusterer 123 is operable to create two clusters of events when it is noticed that a user performs certain tasks when working at a first location during a first time period and performs other tasks when working at a second location during a second time period to inform the heuristic engine 121 that there are two clusters of activity types regularly performed by the user. The content clusterer 123 enables the suggestion engine 122 to provide suggested tasks that are appropriate for a given time and/or location at which those tasks are presented to the user.

For example, the user will be presented with task items related to work on days associated with the work week and business hours, but will be presented with tasks items related to domestic activities (e.g., clean bathroom, go shopping, groom dog) outside of business hours. In another example, the user will be presented with tasks related to work when located at the user's place of work (e.g., detected via Global Positioning System (GPS), Internet Protocol (IP) Location Services, network names in range of the user device 110) and domestic tasks when located at another location (e.g., home, the grocery store, the dog groomer). In various aspects, the suggestion engine 122 will place various weights on clustering determinations that may change over a period of time, so that as time progresses, more or less weight will be given to the clustered content's location, time, or semantic data to allow for blended suggestions. For example, as the workday draws to a close, the user may be presented fewer work related tasks for the day as suggestions, and more domestic related tasks (e.g., "pick up milk on the way home from work"). In another example, when a location or a time period unknown to the content clusterer 123 is observed by the suggestion engine 122, the suggestion engine 122 may rely on the other contextual data used to cluster tasks, such as, when a user is on vacation (in a location previously unknown to the suggestion engine 122), the suggestion engine 122 may rely on time context and semantic context to provide suggestions, and ignore locational context.

A preview generator 124 is operable to generate previews for entities associated with a suggested task (or a selected task). For example, a portion of a document that is to be completed as part of a task is extracted by the preview generator 124 for presentation in a user interface as a preview. In another example, a portion of an audio recording of a phone call that is related to a task is generated as a preview. In a further example, a person who is related to a task (as a resource, an assignor, a teammate, or object of the task) has a preview generated with information from the relational graph service 130, such as, for example, that person's contact information, an image of that person, biographical details of that person, etc.

User profiles 125 are stored by the task list service 120 so that as the behaviors of the users are observed by the heuristic engine 121, the observations are stored to provide an increasingly more accurate view of the user's habits and use patterns for predicting future behaviors. In various aspects, the user or an administrator may also manually set preferences in the user profiles 125 to define how tasks are to be presented to the user and aid the heuristic engine 121 in determining the user's preferences in addition to observing the user's actions to learn those preferences.

A context listener 126 is operable to receive (or request) contextual data and task items from the user device 110 and the services 130-160 for use by the task list service 120. In various aspects, these data include appointments, events, meetings, and tasks set for the user and/or accepted by the user in addition to when and where these appointments, events, meetings, and tasks were set, accepted, worked on, and/or completed. In some aspects, the context listener 126 is operable to provide the state of the computing device (e.g., what applications were active, which application resulted in interacting with the task) to the task list service 120. For example, metadata related to whether a user has looked at a given entity part of a task, how long the user has worked on a given task, how long it took between accepting the task and starting or completing the task, and what interactions were made by the user may be gathered for analysis and reporting.

A relational store 127 stores the relations observed for the creation of task items so that dynamic context can be provided to the user when the task is suggested to the user at a later date. For example, when the user manually or a system automatically creates a task item, the task is parsed to locate entities (e.g., persons involved, objects to be acted on) and recent actions (e.g., actions taken in the last m minutes) that may relate to the task item. For example, if the user receives a message containing the phrase "profit sharing plan" and creates a task that also include that phrase, a relationship between the task and the message will be formed and stored in the relational store 127. In another example, when the user creates a task item to meet with another person, a relationship is formed between the task item, the meeting, and the person so that additional information about the meeting or the person can be recalled (e.g., from the relational graph service 130) when the task item is presented to the user. In various aspects, the node identifiers from the relation graph service 130 for related entities are stored in the relational store 127.

The relational graph service 130 hosts a graph database of a relational graph with nodes describing entities and a set of accompanying properties of those entities, such as, for example, the names, titles, ages, addresses, etc. Each property can be considered a key/value pair—a name of the property and its value. In other examples, entities represented as nodes that include documents, meetings, communication, etc., as well as edges representing relations among these entities, such as, for example, an edge between a person node and a document node representing that person's authorship, modification, or viewing of the document. The relational graph service 130 executes graph queries that are submitted by various users to return nodes or edges that satisfy various conditions (e.g., users within the same division of a company, the last X documents accessed by a given user). In various aspects, the relational graph 130 is in communication with the other services 140-160 to match actions to documents and track edges between nodes representing entities from those other services 140-160.

The email service 140 hosts the email communications for one or more users. In various aspects, the email service 140 is part of or includes a directory service for an organization. In other aspects, the email service 140 is integrated into or accessible by a productivity application of the productivity services 160. For example, an email server storing email messages for an organization is accessible by email applications for members of that organizations and acts as an email service 140 accessible by the task list service 120.

Emails provided from the email service 140 may be added as entities in the relational graph 130, and/or the communications embodied by the emails are treated as edges between communicating parties. In various aspects, emails that are part of the tasks (e.g., "send an email to John Doe") that are monitored by the task list service 120, and also provide context for other tasks, such as, for example, when a task is originated in an email (e.g., an email whose content includes "please review the meeting agenda" originates the task of "review meeting agenda").

The calendar service 150 hosts calendar and appointment information for one or more users. Various appointments, meetings, and events (collectively, events) are stored in the calendar service 150 that include one or more persons as participants/hosts. Events include one or more of: participants (required or optional), attendance information, times, locations, resources, attached documents, and event information (e.g., event title and description). In various aspects, the calendar service 150 is provided in a unified email/calendar application, such as, for example, THUNDERBIRD® (offered by the Mozilla Fnd of Mountain View, Calif.) or GMAIL® (offered by Alphabet Inc. of Mountain View, Calif.), which stores events for a user of that application. In other aspects, the calendar service 150 includes a social media platform, such as, for example, FACEBOOK® (offered by Facebook, Inc. of Menlo Park, Calif.) where various events are posted that users may attend.

Events provided from the calendar service 150 may be added as entities in the relational graph 130, and/or the interactions embodied by the events are treated as edges between interacting parties. In various aspects, events are part of the tasks (e.g., "attend birthday party") that are monitored by the task list service 120, and also provide context for other tasks, such as, for example, when a task is originated in an event (e.g., action items created during a meeting).

The productivity service 160 includes one or more productivity applications and document repositories that are accessible by one or more users. In various aspects, the productivity service 160 is hosted on the user device 110 and/or a remote server accessible by the user device 110. For example, the productivity service 160 includes a locally executed authoring application (e.g., PAGES®, KEYNOTE®, or NUMBERS® offered by Apple, Inc. of Cupertino, Calif.) and remotely executed authoring applications (e.g., the GOOGLE DOCS™ suite offered by Alphabet, Inc. of Mountain View, Calif.) that are accessible via a thin client or web browser. In another example, the productivity service 160 include a library of documents stored on the user device 110 as well as libraries stored on networked computers or as part of a document management system and remote storage locations (e.g., GOOGLE DRIVE™ offered by Alphabet, Inc. of Mountain View, Calif.).

Documents provided from the productivity service 160 may be added as entities in the relational graph 130. In various aspects, documents are part of the tasks (e.g., "edit the quarterly report") that are monitored by the task list service 120, and provide context to report on how tasks have been handled to an initiating or collaborating party. For example, when a manager assigns the task of "edit the quarterly report" to an employee, the manager may receive an indication when the employee has completed the task, and the interactions that comprise that task. Similarly, when a manager assigns the task to a work group of several employees, when one employee assumes the task (e.g., begins work, accepts the task, completes the task), the other employees may be notified that the task has been assumed by their coworker.

In various aspects, the services 130-160 are operable to transmit interactions to the task list service 120 or to have interactions listened to/pulled from the services 130-160 to the task list service 120. An API (Application Program Interface) or agent between the task list service 120 and services 130-160 facilitate communication between the services 130-160 and the task list service 120, ensuring communications are received in a format interpretable by the receiving service. In one example, the SIRI® or GOOGLE NOW® personal digital assistants (offered by Apple, Inc. and Alphabet, Inc., respectively) may parse the sources 130-160 as agents to report relevant data to the task list service 120. In another example, the sources 130-160 are configured to communicate to the task list service 120 as actions are taken in those services 130-160 in a format specified via an API.

FIGS. 2A-15 illustrate various example user interfaces for a task list application employing the tasks list service 120 to improve the efficiency in how tasks are presented to the user. As will be appreciated, FIGS. 2A-15 are provided as non-limiting examples and other arrangements and groupings of user interface elements with different content are included in the concepts of the present disclosure.

Figure 2A:
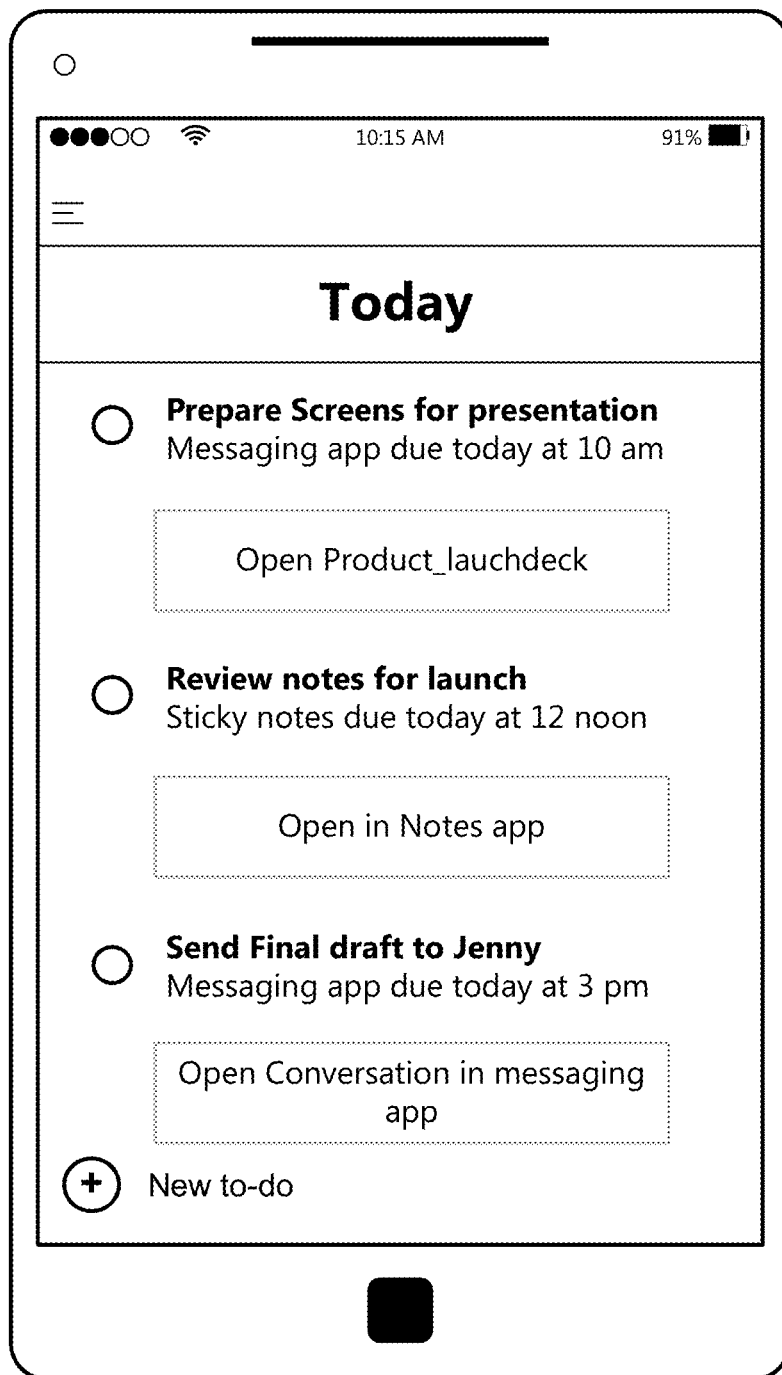
FIGS. 2A and 2B are illustrations of example graphical user interfaces in which a task list is implemented.
Figure 2B:
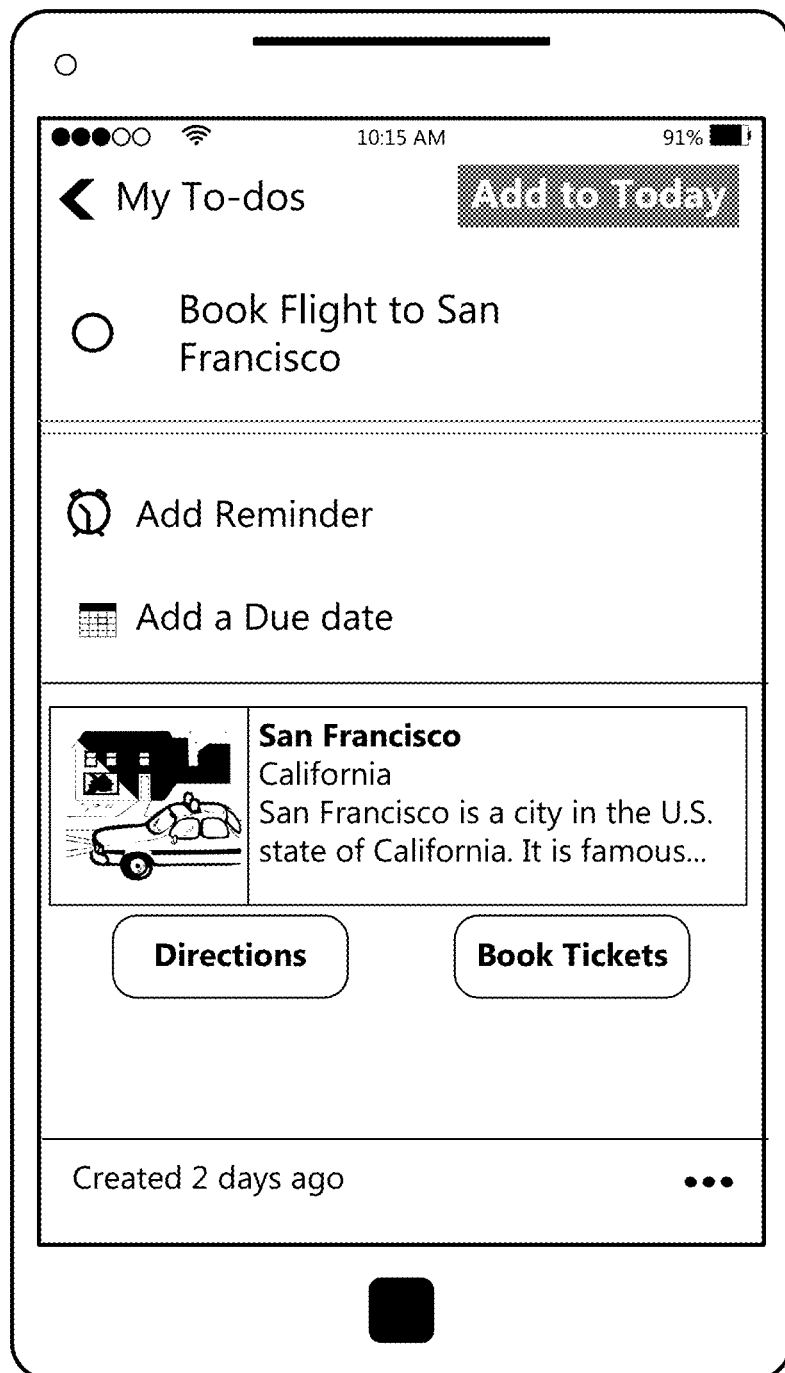

FIGS. 2A and 2B are illustrations of example graphical user interfaces in which a Task List is implemented. The task list user interface illustrated in FIG. 2A displays the scheduled tasks for "today". In one aspect, along with the task item, a link to the application relevant in completing the task item is provided. For example, the second item on the task list user interface displayed in FIG. 2A, is "review notes for launch". A link to the notes application is provided along with the task item to allow the user to access the notes application from the task list application, instead of the user having to search for the application and then open it.

In one aspect, a link to the content item relevant to completing the task item is provided. For example, the first task item is "prepare screens for presentation". The task item is provided along with the content item "product launchdeck" to allow the user to access the content item "product launchdeck" in the presentation application without having to remember the content item and its location to complete the task item "prepare screens for presentation". Content items include various file formats for authoring and/or viewing content, such as, for example: word processing files, email files, calendaring files, spreadsheet files, database files, note taking files, presentation files, image files, audio files, video files, etc.

In one example, the tasks for "today" are listed in the order of time when they are due. In another example, they are listed in the order of priority. According to an example, the priority is identified by the system. In another example, the user is allowed to provide the priority details when creating the task item.

According to an aspect, the task list user interface illustrated in FIG. 2B displays a suggested task list item. As illustrated, a suggested task list item "Book flight to San Francisco" is provided. According to an aspect, the task is suggested based on user context. User context may be developed by the system gradually by learning user patterns and user interaction data. The option to add the suggested task item to the task list shown in FIG. 2A is provided. According to another aspect, the link provides a brief description of the task list item. For example, as illustrated in FIG. 2B, a brief description of the city of San Francisco is provided along with the suggested task list item "Book flight to San Francisco". In another example, others options such as for example, an option to provide "directions" to the city and an option to "book tickets" are provided.

Figure 3:
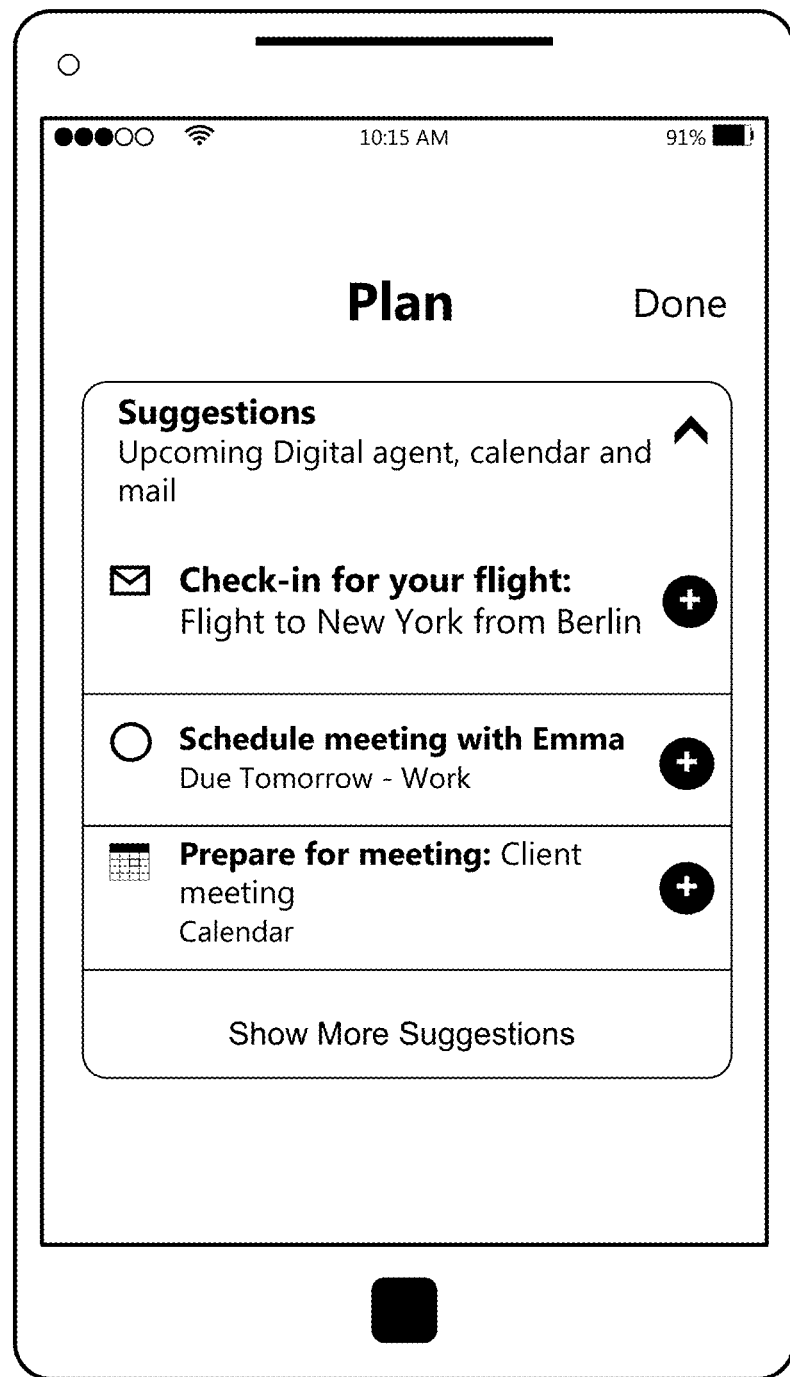
FIG. 3 illustrates an example graphical user interface in which is displayed suggested tasks on which a user may focus.

As illustrated in FIG. 3, the system displays suggested tasks for user to focus on. In the example illustrated in FIG. 3, the first task list item "Check in for your flight" is provided as a focus item for the user. The system identifies a flight reservation in one or more applications accessed by the user, such as the mail application in which the flight confirmation may have arrived. Based on these identified data, the system provides the task list item "Check in for your flight".

According to another aspect, the system reviews the task list and suggests a task item that may not be due today, as a focus item. For example, if the system identifies a meeting scheduled for Friday, and the task item "prepare for meeting" is scheduled for Wednesday. The system may further identify that there are more task items scheduled for Wednesday than on Tuesday, and the system uses these data to provide the task item, "prepare for meeting" on Tuesday as focus task list item instead of on Wednesday.

Figure 4A:
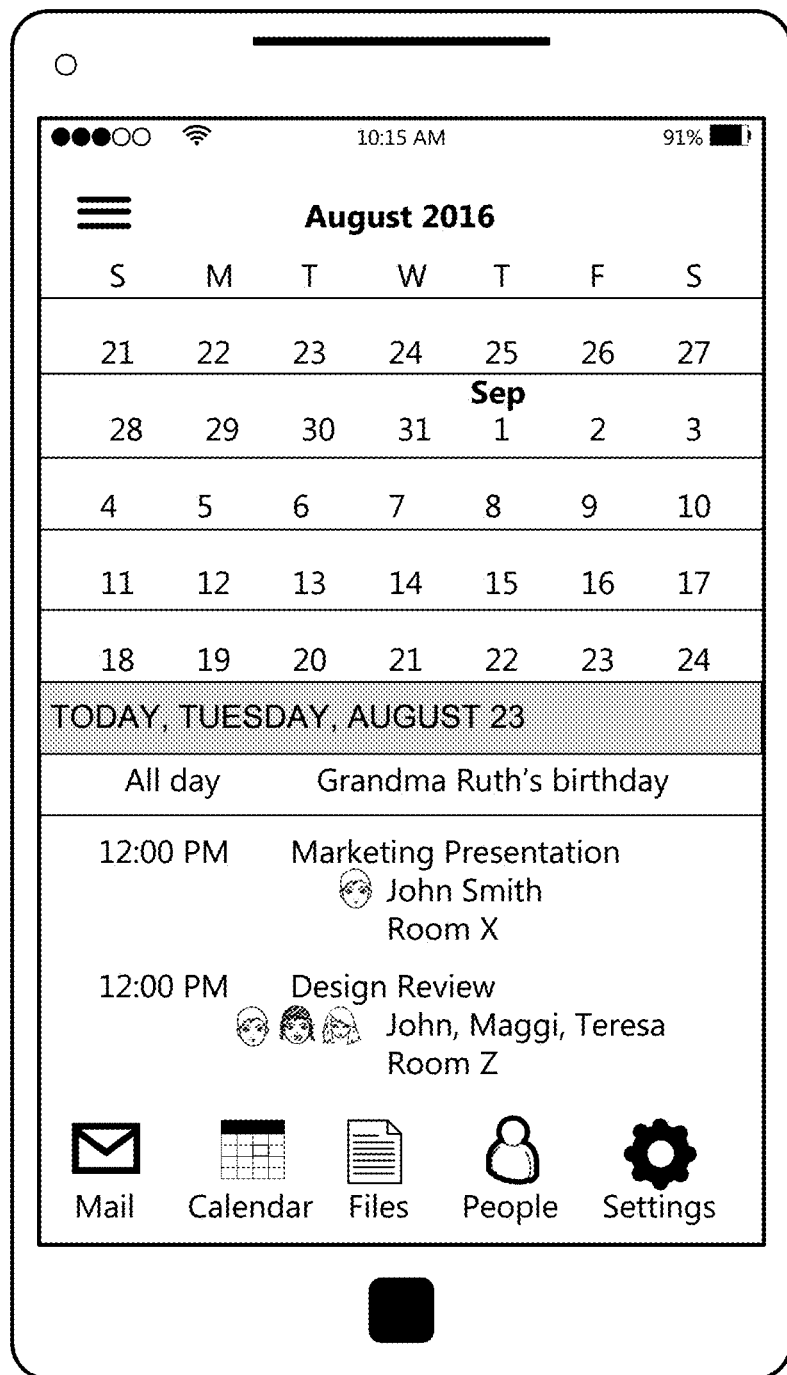
FIG. 4A illustrates a calendar application showing one or more events illustrated in relation to a calendar and order of occurrence for a day.

As illustrated in FIG. 4A, a calendar application showing one or more events (appointments, meetings, or events) is illustrated in relation to a calendar and order of occurrence for a day.

Figure 4B:
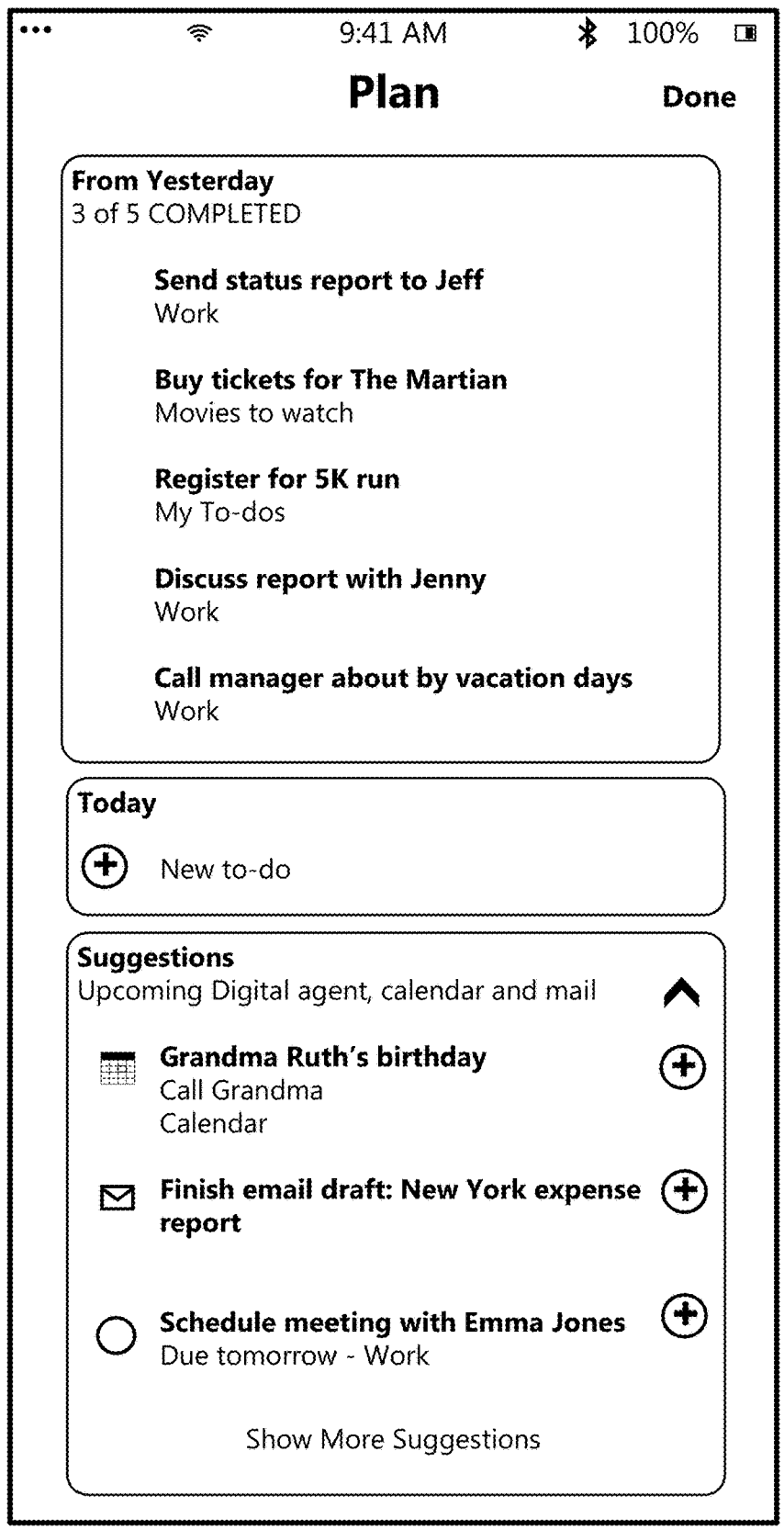
FIG. 4B illustrates a Plan of tasks for the user based on data received from the calendar application illustrated in FIG. 4A.

As illustrated in FIG. 4B, the system provides a Plan of tasks for the user based on data received from the calendar application illustrated in FIG. 4A. As illustrated, the task items that were not completed yesterday from the tasks application are provided to the user today. Further, an interface allowing the user to add a new task is provided. In one aspect, as illustrated in FIG. 4B, the system provides the suggested tasks to the user based on data learned from one or more productivity applications (e.g., the calendar application shown in FIG. 4A) by digital agents, for example, SIRI® (offered by Apple, Inc. of Cupertino Calif.) or ECHO® (offered by Amazon.com, Inc. of Seattle, Wash.), email applications, calendar applications, etc. For example, the suggestion task of "call grandma" is provided from the data learned from the calendar of a task item "Grandma Ruth's Birthday".

Figure 5:
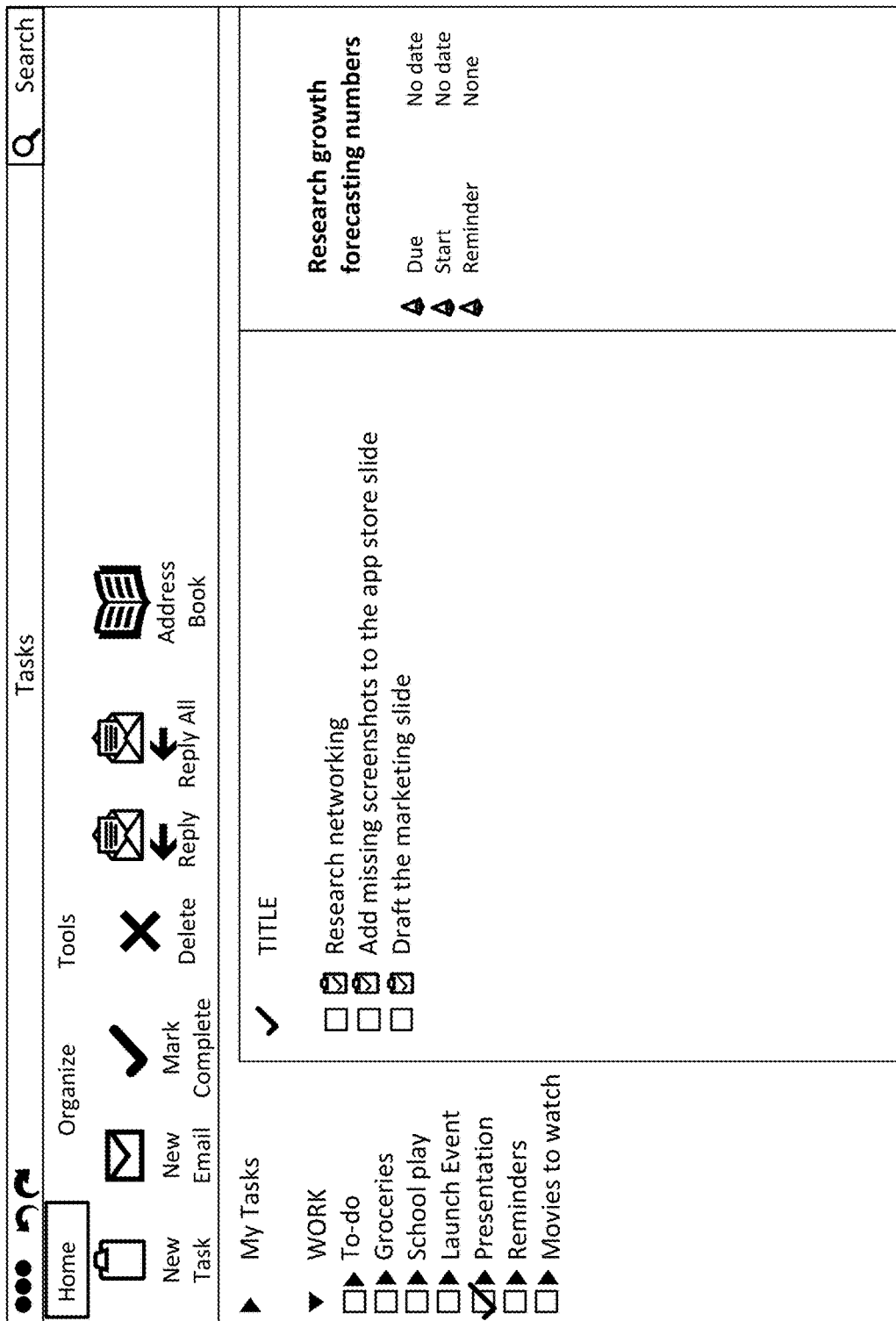
FIG. 5 illustrates an example graphical user interface in which Task List implementation is provided.

FIG. 5 is an illustration of an example graphical user interface in which Task List implementation is provided. In one aspect, the task list provides a list of task categories. For example as illustrated in FIG. 5, the category list of tasks is provided on the left, showing several categories and sub-categories (e.g., "To-Do", "Groceries", "School Play", Launch Event", "Presentation", "Reminders", and "Movies to watch"). Upon selection of one or more categories, such as "presentation", the task items associated with the category—in this example, "presentation"—are provided in the middle of the illustrated graphical user interface. Further, additional details for task items such as due date, start date, reminders, descriptions, etc., that are associated with the task list, are provided along with the task list items, to the right of those items in the illustrated example.

FIG. 6 is an illustration of an example graphical user interface in which Task List item creation from within a productivity application is shown. As is illustrated in FIG. 6, a task creation option is provided in an email productivity application. In one example, the system identifies the "volunteer registration" as an entity possibly related to a task and identifies the candidate time as "tonight" and provides the task creation control. Upon selection of the task creation control, the "volunteer registration" task is created as a task item for "tonight". In another aspect, the user selects the task creation option and identifies the objects, persons, and times relevant to that task. In various aspects, dialogs or prompts are provided to the user to select the values from the productivity application or manually input those values to build the task.

Figure 7:
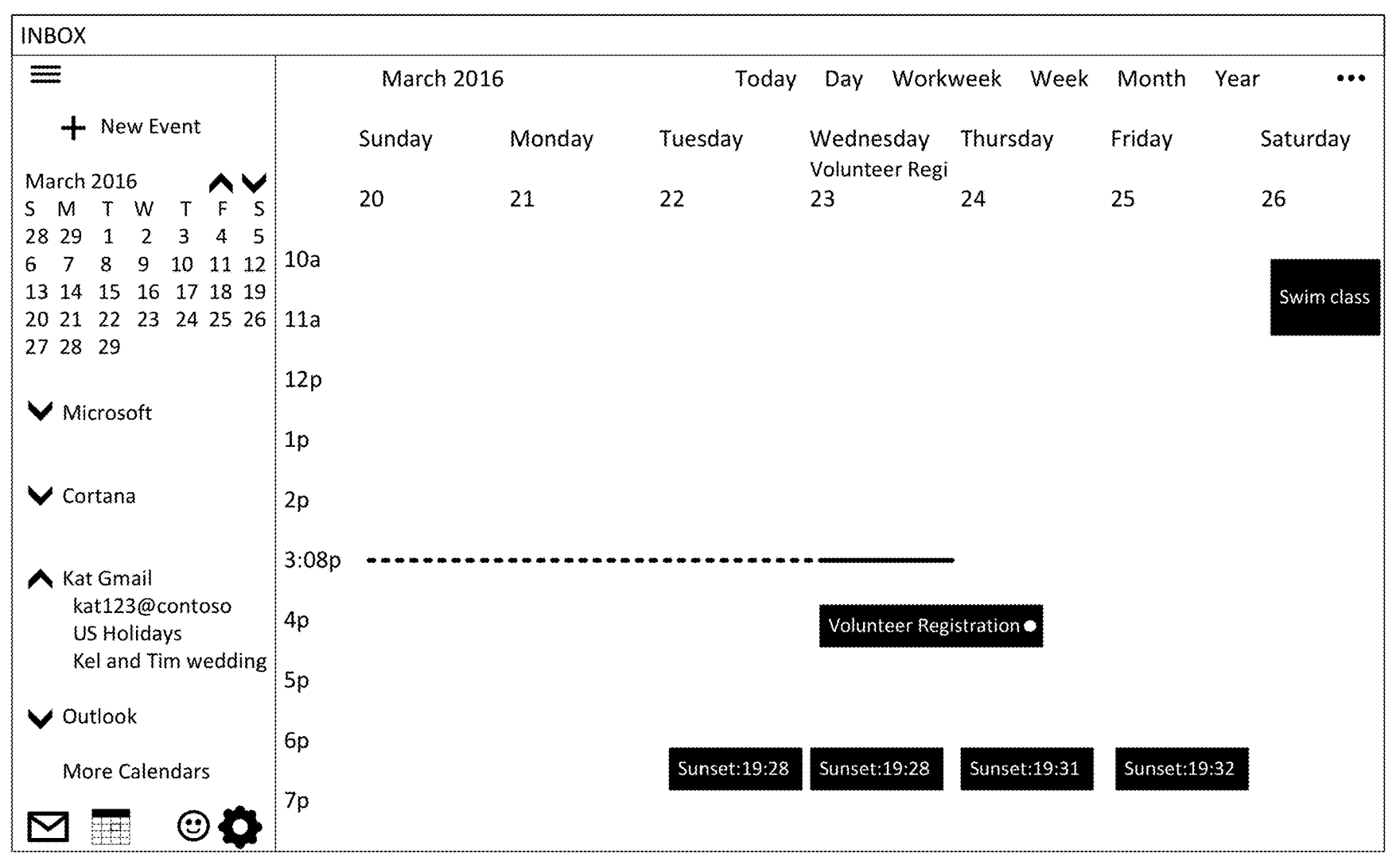

FIG. 7 is an illustration of a graphical user interface in which a Task List is implemented. In one aspect, upon selection of the Task creation option in FIG. 6, the task item is created in relation to the content item from which it was created and is displayed in a calendar. For example, the system identifies the "volunteer registration" task in the email illustrated in FIG. 6 and that the task needs to be completed tonight—relative to the day of creation or a date in the content item. The system creates the task and displays the task in the calendar application as illustrated in FIG. 7 for completion tonight. In one example, the user is provided with an option whether to accept the task or to make any desired changes to the task such as for example, change the date and or time, reassigned the task, etc.

Figure 8:
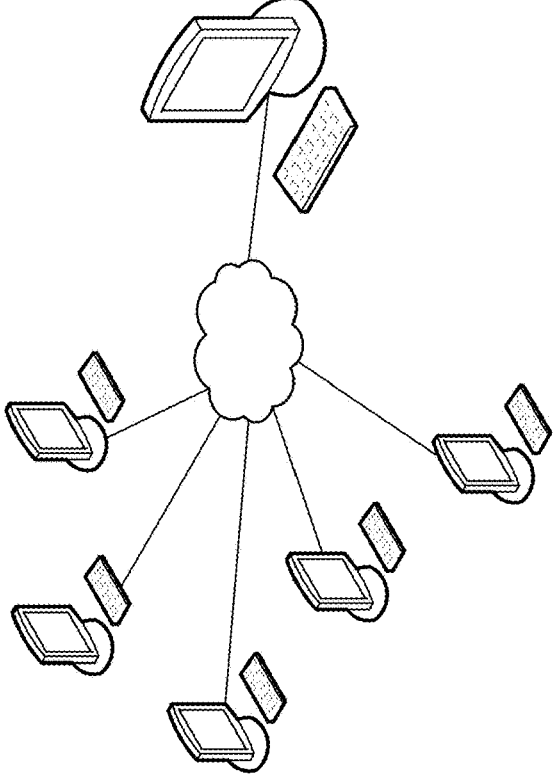
FIG. 8 illustrates a graphical user interface in which a Task List is implemented within the productivity application in which it can be completed.

FIG. 8 is an illustration of a graphical user interface in which a Task List is implemented within the productivity application in which it can be completed. For example, as illustrated in FIG. 8, a presentation application is in use and the tasks from the tasks list that are identified by the system to be completed in the presentation application are displayed for the user therein. This allows the user to open the task application and view the tasks to be completed without switching to the task list application. In various aspects, the user is also linked to the document or section of the document, via a hyperlink in the user interface that is related to the task item, to improve user navigation to task-relation documents or portions thereof.

In another aspect, the user is allowed to add a task item, as illustrated in FIG. 8, from the productivity application without having to open or give focus to the task list application for interacting with the task list items. For example, the user is allowed to add a task item to the task list from the presentation application without ever leaving the presentation application and without having to access the task list application to create a task list item.

Figure 9:
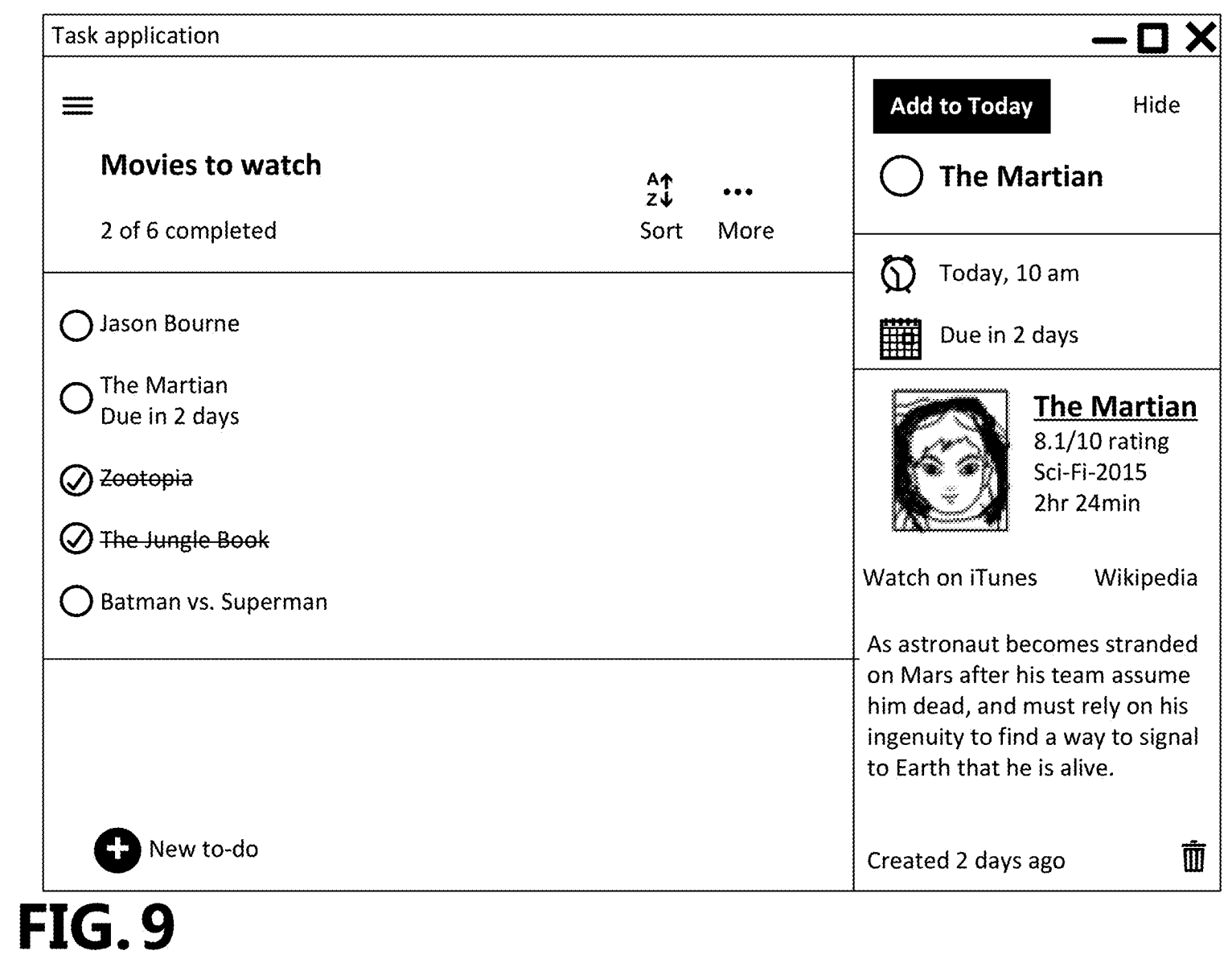

FIG. 9 is an illustration of a graphical user interface in which a task application provides the task list items in relation to a task list category along with additional data about the selected task list item. For example, as illustrated in FIG. 9 the task items for the task list category "Movies to watch" are displayed for the user. The movies that may be recently watched and completed in the task list are marked completed and shown with a strike though, a check mark, or other indicia of their completion or rejection. Additional information about the selected task item (a movie in this example) is also provided. The additional information may include a brief description of the task item, an option of an application that can be used to interact with the task item, a link to access additional information about the task item in an online encyclopedia or relational graph, etc. In one example, the system provides the user with the due date data and allows the user to add the selected task item to a time period list (e.g., "today's tasks"). In one example, an option to create a new task item is also provided. Further, another option to delete the selected task item is also provided.

Figure 10:
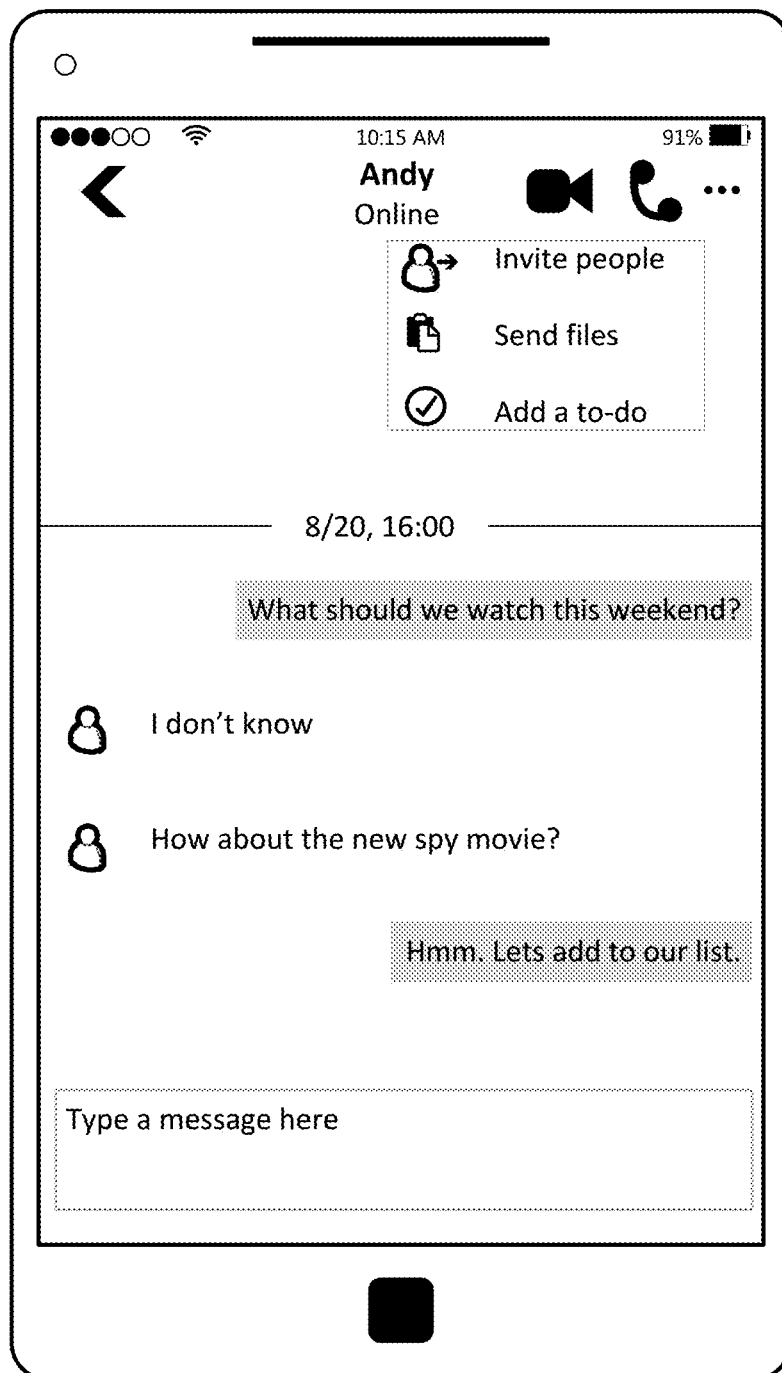
FIG. 10 illustrates a graphical user interface in which an interface to create a task list item is provided within a productivity application, such as a messaging application.

FIG. 10 is an illustration of a graphical user interface in which an interface to create a task list item is provided within a productivity application, such as for example, a messaging application. As illustrated in FIG. 10, an option to create a task list item is provided within a messaging application for a user to select. In one example, once the system identifies a task item is to be created, the productivity application is parsed for relevant objects for inclusion in the task item. For example, a series of messages in a conversation document of a messaging application are parsed to identify objects of "spy movie" and a task time "this weekend", to prepopulate a task item. The user is provided an interface to accept or substitute different values for the prepopulated with an option to add the task list item in the task list application.

In another example, once the system identifies a task list item, for example, "spy movie" and a task time "this weekend", the system automatically adds the task list item to the tasks list application. Further, in one example, the user visits the task list application and views the task list categories of movies to watch to find the "spy movie" task list item and does not remember the context in which the movie was added to the task list. The system may provide a context along with a link to the particular messaging conversation to the user, with the "spy movie" task list item, in the task list application.

Figure 11:
FIG. 11 illustrates an additional option for creating a task list item within the example messaging application.

FIG. 11 illustrates an additional option to create a task list item within the messaging application. For example, a user may select an option to add a task item from the productivity application via a control or menu, as illustrated in FIG. 10, or a control may be provided contextually by the task list service 120 within the productivity application in response to the user's actions. For example, as illustrated in FIG. 11, when a user is entering text into a field, a control to create a task based on the contents of the field may be provided so that the user does not need to access a menu or control as part of a ribbon, but instead is provided a contextual control proximate to where the user is interaction with the productivity application.

Figure 12:
FIG. 12 illustrates a graphical user interface in which the creation of a task list item is shown within a communication application, such as, for example, a messaging application.

FIG. 12 is an illustration of a graphical user interface in which the creation of a task list item is shown within a communication application, such as, for example, a messaging application. The system provides an agent which can be added as an entity to the user's contact list. For example, as illustrated in FIG. 12, the user is allowed to create a task list item by sending a message to the task list agent or an agent within the messaging application. Further, the agent sends a message to the user via the messaging application confirming that the task list item has been created. In another aspect, along with the confirmation message, the agent also provides additional information related to the task list item. For example, as illustrated in FIG. 12, when the user requests the agent to create a task to "make a reservation for dinner at the famous restaurant", the system provides a confirmation message, via the messaging application, notifying the user that the task list item has been created along with additional relevant information, such as, for example, a brief review of the restaurant, the timing of the reservation, a rating from a popular review site, a link to access the website of the restaurant, and a link to access directions to the restaurant, etc.

Figure 13:
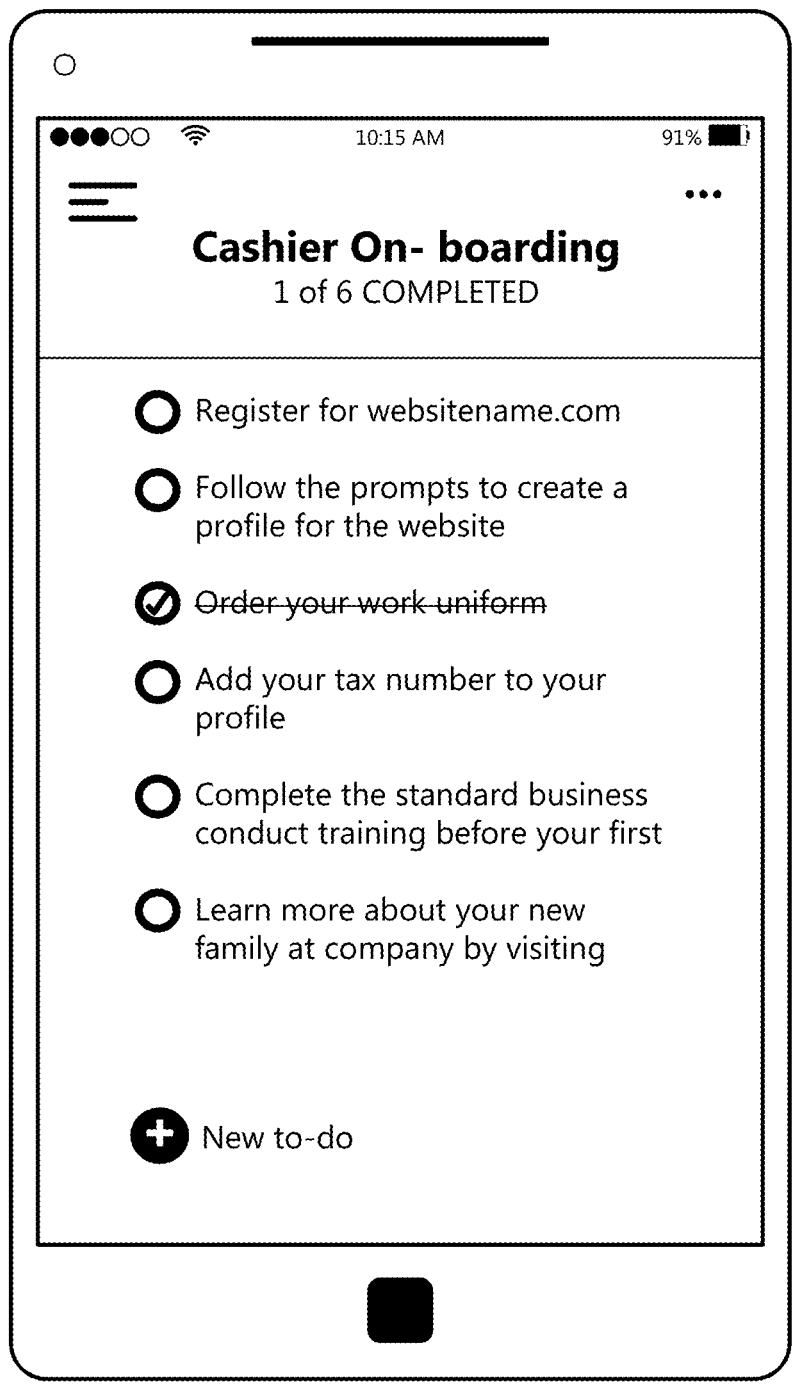
FIG. 13 illustrates a graphical user interface in which a task list application template is provided.

FIG. 13 is an illustration of a graphical user interface in which a task list application template is provided. Task list templates allow for the task items of a given list to be presented in repeated circumstances. For example, one or more task list templates may be provided to easily share information between the employees of an organization. In another example, a template task list may be added to a new employee's task list by the employee's manager, wherein that template task list is provided to each new employee for onboarding purposes, and the manager may receive notifications of the status of the completion for that employee. As task list items are completed by the employee the tasks will be marked as complete for that employee, but another new employee, who was provided the same template list, will need to independently fill out the task items; despite being based on the same template, each user receives a unique task list.

In various aspects, the task list templates are set up manually. In other examples, task list templates are created automatically. For example, a grocery shopping task list template is created for a user based on the user's previous task lists for grocery shopping so that frequently purchased items automatically appear as items on the task list. The user may manually add to the template task list or to the resultant individual task list (e.g., always buy bread (add to template), buy bread this time (add to individual task list)). In various aspects, task lists for repeated tasks include items with varying frequencies (e.g., every time the list is created, every other time the list is created, after n days since the last list was created) so that, for example, a template for grocery shopping includes a task item for "buy toothpaste" that appears as part of the template task list, but only appears on the grocery shopping task list for an individual reminder to go grocery shopping once per month, despite the user going grocery shopping (based on the template task list) four times per month.

Figure 14A:
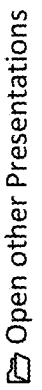
Figure 14B:
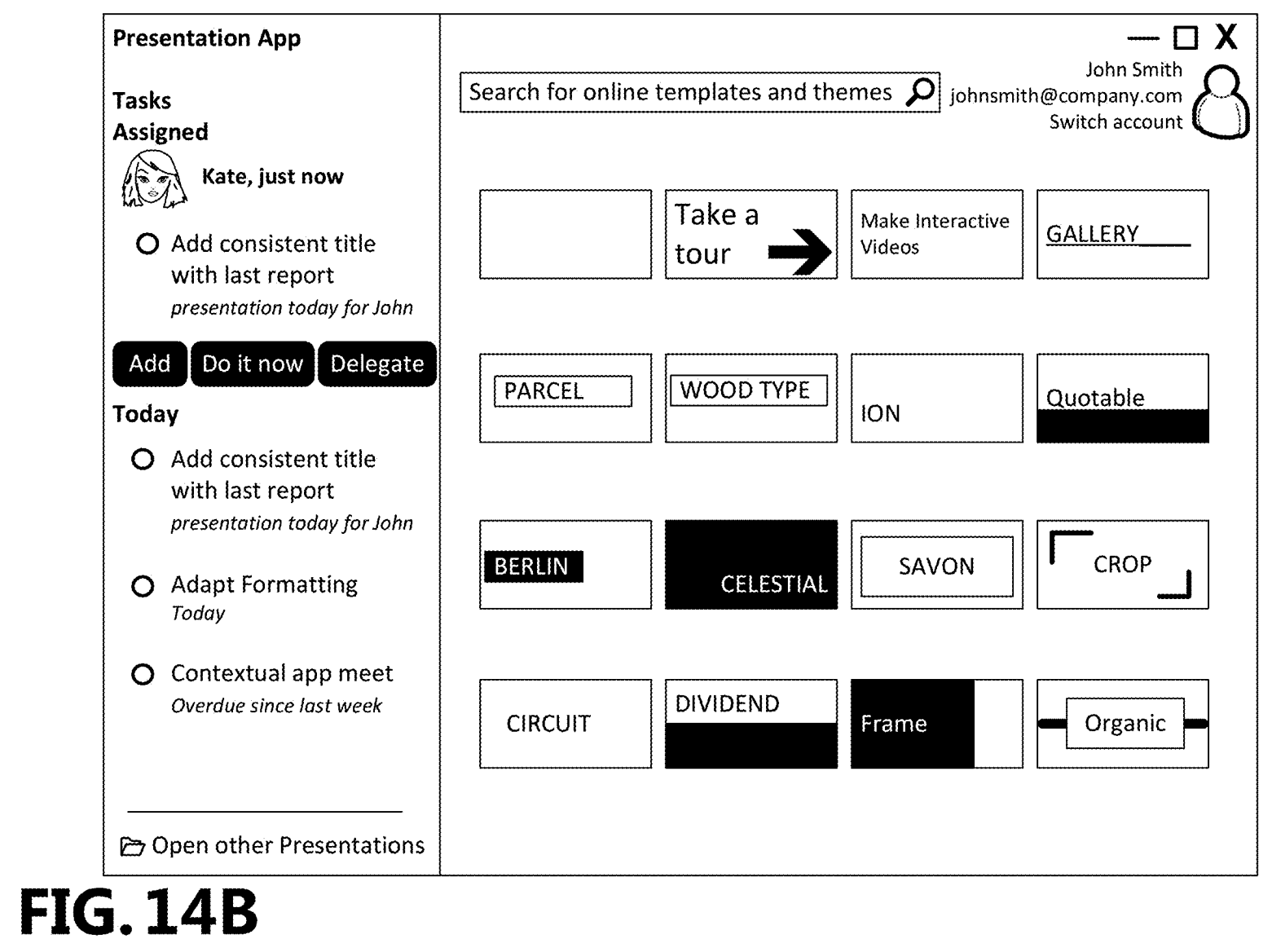

FIGS. 14A and 14B are illustrations of a graphical user interface in which a task assigned by a first user can be provided to a second user in the application relevant in completing that task item. For example, as illustrated in FIG. 14A, the task list items related to the presentation application that will need to be completed within the presentation application are provided as soon as the second user accesses the presentation application. Along with the task list item, additional information about the first user who assigned the task list item, due date, percentage completed is provided. In another example, as illustrated in FIG. 14B, the system allows the user to add an assigned task list item to the user's own task list for later completion by selecting "Add", to perform the task at that moment by selecting "do it now", or to delegate the task to another user by selecting "delegate". In one example, the system provides a notification to the first user (the task assignor) of the second user's selection to update the status or assignee of the task list item.

Figure 15:
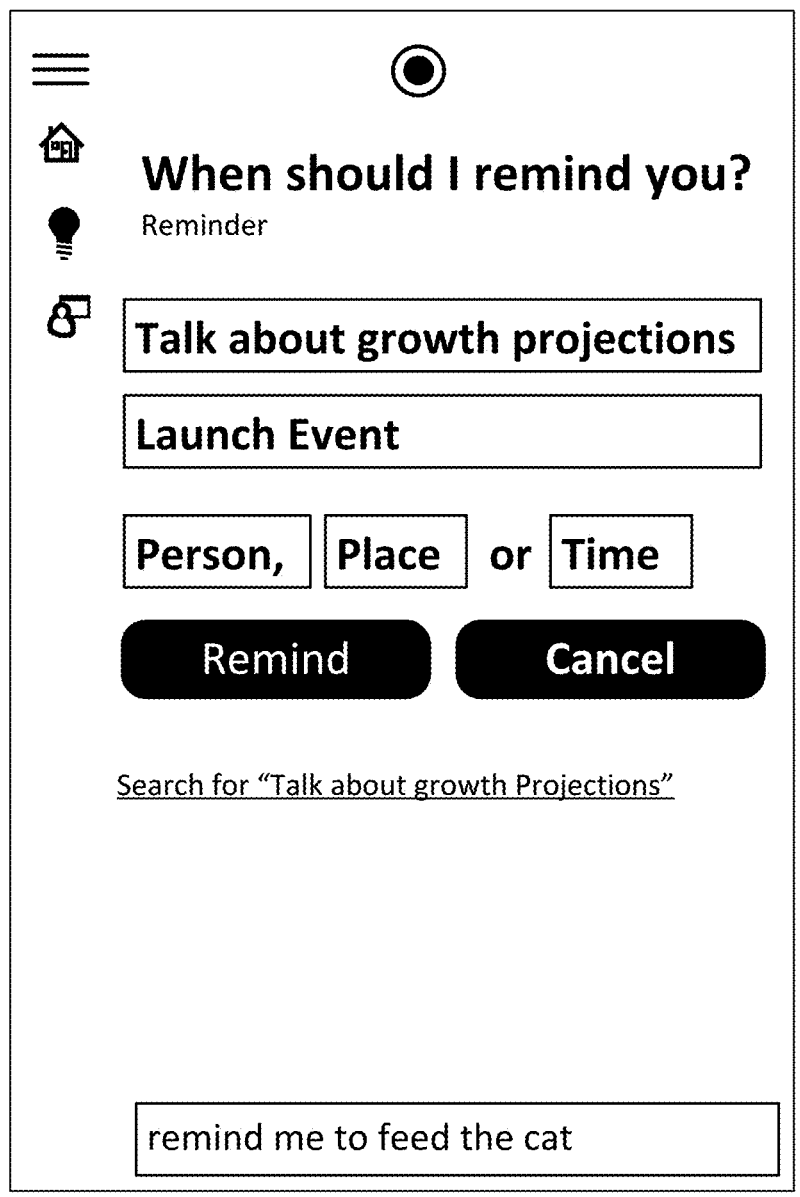
FIG. 15 illustrates an example user interface for a digital assistant to create task items.

FIG. 15 illustrates an example user interface for a digital assistant to create task items. As illustrated in FIG. 15, a digital assistant has been invoked and provides various controls for defining a task item. In various aspects, user input may be received by the digital assistant from input devices such as keyboards, mice, and touch screens, but also from microphones when the digital assistant is operable to interpret speech for content input and commands. The digital assistant may be invoked by the user uttering a command sequence to summon the digital assistant, selecting a control in a user interface, or automatically in response to user actions in a productivity application, task list application, or operating system.

Input fields include, but are not limited to, title, description, persons involved, places involved, and times involved fields. The user is operable to set which task list the task item is added to, or the system may automatically add the task item to a task list according to a determination of common subject matter, time, or location according to a clusterer 123. Additional controls are provided for the user to accept the creation of the task item (e.g., "remind"), reject the creation of the task item (e.g., "cancel"), and to locate additional data related to the task item (e.g., "search for . . . ").

Figure 16:
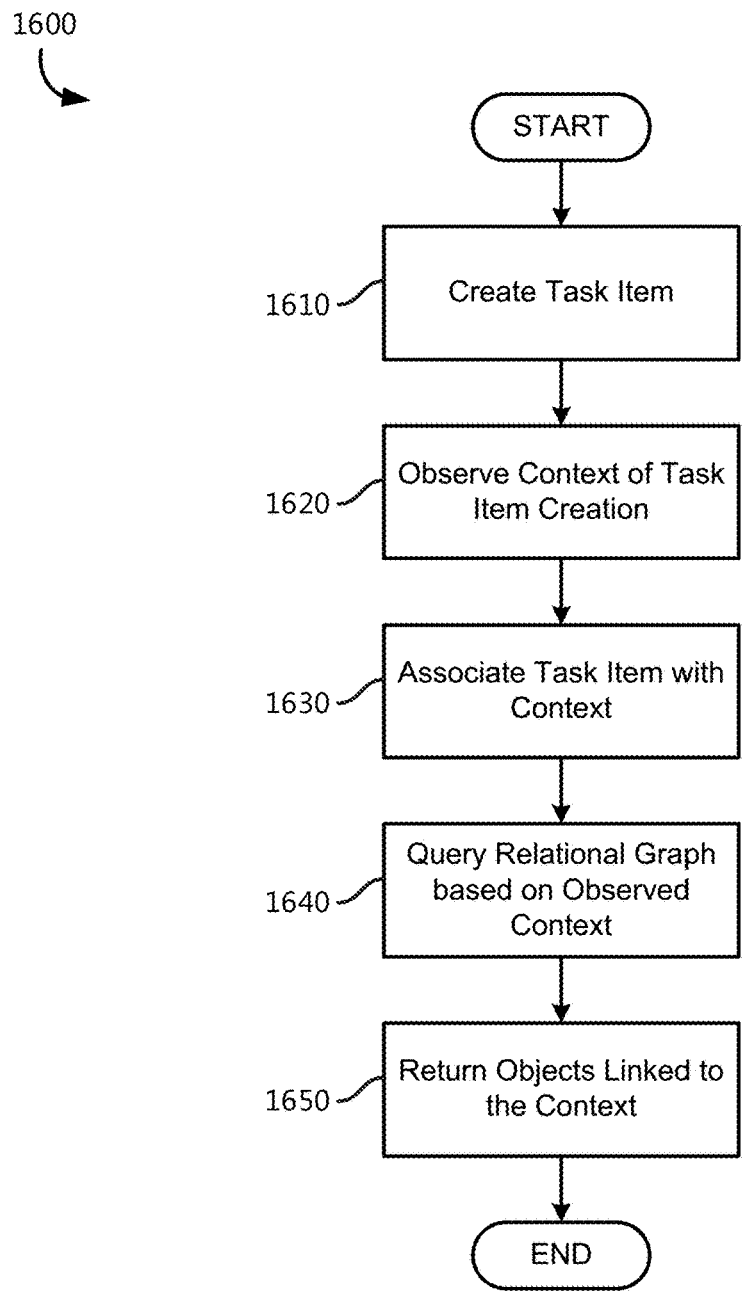
FIG. 16 is a flow chart showing general stages involved in an example method for enhancing efficiency by providing dynamic context for tasks to provide the user with greater ability to recall the details and circumstances related to the tasks.

FIG. 16 is a flow chart showing general stages involved in an example method 1600 for enhancing efficiency by providing dynamic context for tasks to provide the user with greater ability to recall the details and circumstances related to the task, as well as, supplemental information to augment the understanding of the task.

For example, a user with a task in a task list for "follow-up on the documents" will understand what documents are to be followed-up on and for whom and when the task item is added to the task list, but may forget those details as time progresses. To alleviate the loss of context for a task item, the task list service 120 automatically relates the context with the task so that as tasks are created, actions and entities that lead to the creation of the task are captured for later review. For example, if a user received an email from "John" asking that the user send him a document, then the user (or the task list service 120 on the user's behalf) may have created the task item from within the email or while the email recently held focus in an email client or operating system. The task list service 120 is thereby enabled to continuously track that context so that when the user look at tasks in the task list application, the originating context will be shown as well as supplemental information. Continuing the above example, links to access the email that the task is related to; an excerpt, preview, or link to the documents to follow-up on; and the biographical information of the sender, receivers, or other parties mentioned in the email (or related to those parties in the relational graph service 130) will be shown to give the user more details on how the task item is to be completed.

In another aspect, content items that may add additional context to an existing task item are identified and used to supplement the context of the task item. Continuing the above example, when a user receives a status request from another party about a task item (e.g., an email, phone call, instant messenger message), such as "how close are you to completing that document for John?," the task list service 120 is operable to identify the task item in question and associate the status request with the task item. By associating a new content item with a task item, the user can access the task item from the example status request or later review the task item and see in its context that a status request was made as to its progress.

Machine learning techniques are employed to determine what information related to context objects linked to task items to provide to the user. The heuristic engine 121 is operable to learn and use semantically connected relationships to source and create relationships between tasks and objects in other systems and services 130-160 throughout the operating environment. For example, the heuristic engine 121 is operable to learn over time how to filter the available contextual information to provide the contextual information that is desired by the user so that certain terms, such as, for example, docket numbers, project names, working groups, etc., are learned and used to link objects to provide dynamic context to the user's task items.

Method 1600 begins at OPERATION 1610 in response to a task item being created in the task list system 120 and proceeds to OPERATION 1620, where the context of the task item creation is gathered. In various aspects, which applications and documents are open or have focus prior to task item creation are observed. In another aspect, events occurring when the task item is created are observed, such as, for example, whether the user was in a meeting when the task was created and the task item is therefore (likely) an action item for that meeting and related to the other persons from the meeting.

Proceeding to OPERATION 1630, the task item is associated in a relational graph with the context observed in OPERATION 1620. In various aspects, the node identifiers from the relation graph service 130 for the context entities (e.g., documents/communications open at the time of task item creation, persons co-scheduled for an ongoing event at the time of task item creation) are stored in the relational store 127 in association with the node identifiers for the task items and are related to one another via edges in the relational graph.

At OPERATION 1640 the relational graph service 130 is queried for information related to the contextual entities related to the tasks item. The relational graph is spanned, beginning from either the node representing the given user or from the node representing the task item assigned to the given user, along the edges representing context relationships to the nodes representing events, documents, or persons observed as providing context. In various aspects, the query includes requests for the contextual entities stored in the relational store 127 as well as entities located within n nodes of a contextual entity from the relational store 127. For example, when two persons who are members of a group are noted as related to a task item, the other members of that group (who may not have been contextually related to the task item—they may not have been co-scheduled for the meeting that originated the task item) may be discovered in the relational graph and presented as related to the task item based on their inclusion in a shared group with the original two persons.

Proceeding to OPERATION 1650, information on the objects linked to the context are returned to the user. In various aspects, the information is returned as hyperlinks to the context objects or as previews for the context objects. For example, a user may be provided a hyperlink to a meeting, email, or document that is determined to have initiated a task item. In another example, a contact card for a person related to the task item is provided (showing an image or avatar for that person, biographical details, organization chart details, contact information, etc.). Method 1600 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 17:
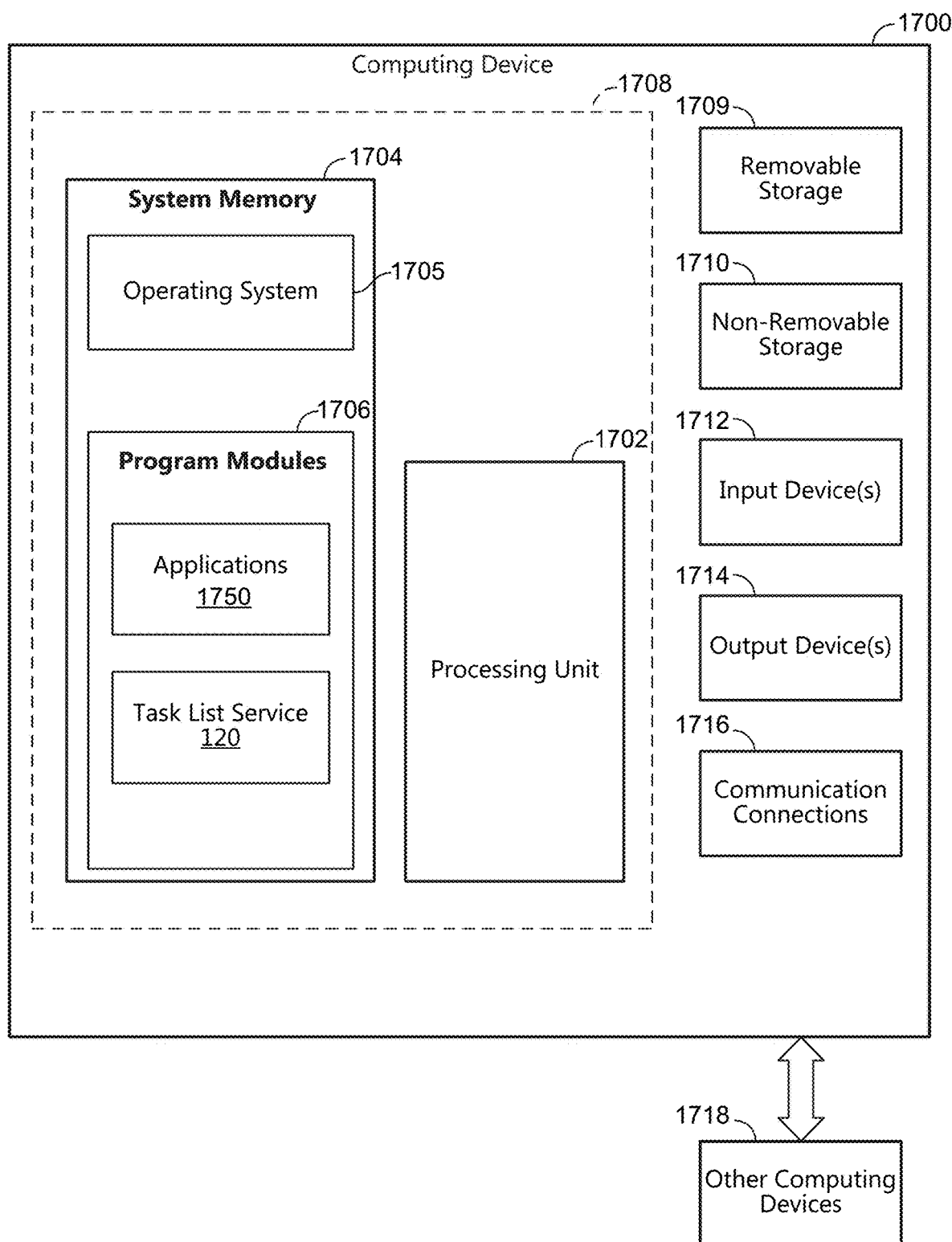
FIG. 17 is a block diagram illustrating example physical components of a computing device.
Figure 18A:
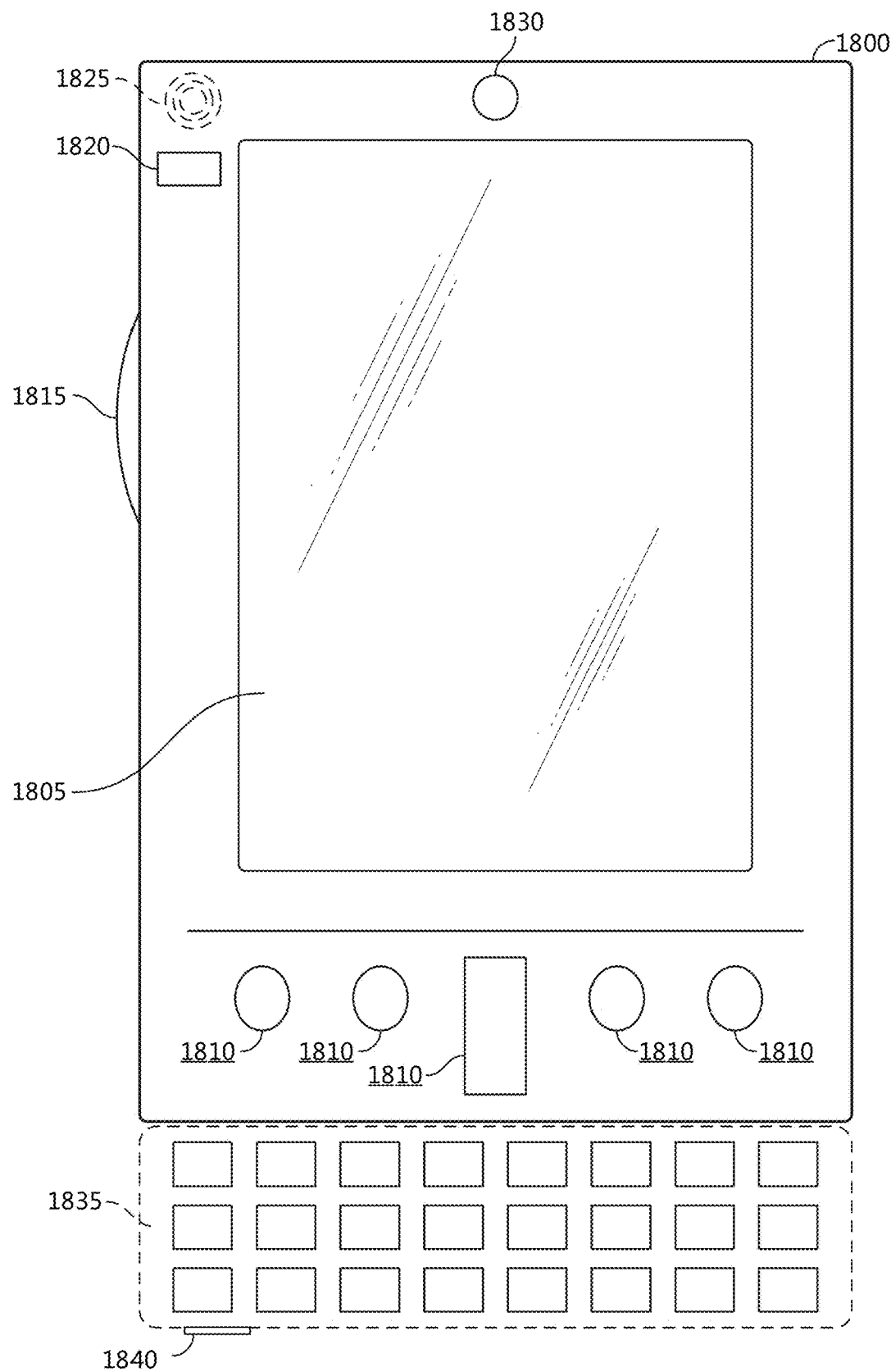
FIGS. 18A and 18B are block diagrams of a mobile computing device.
Figure 18B:
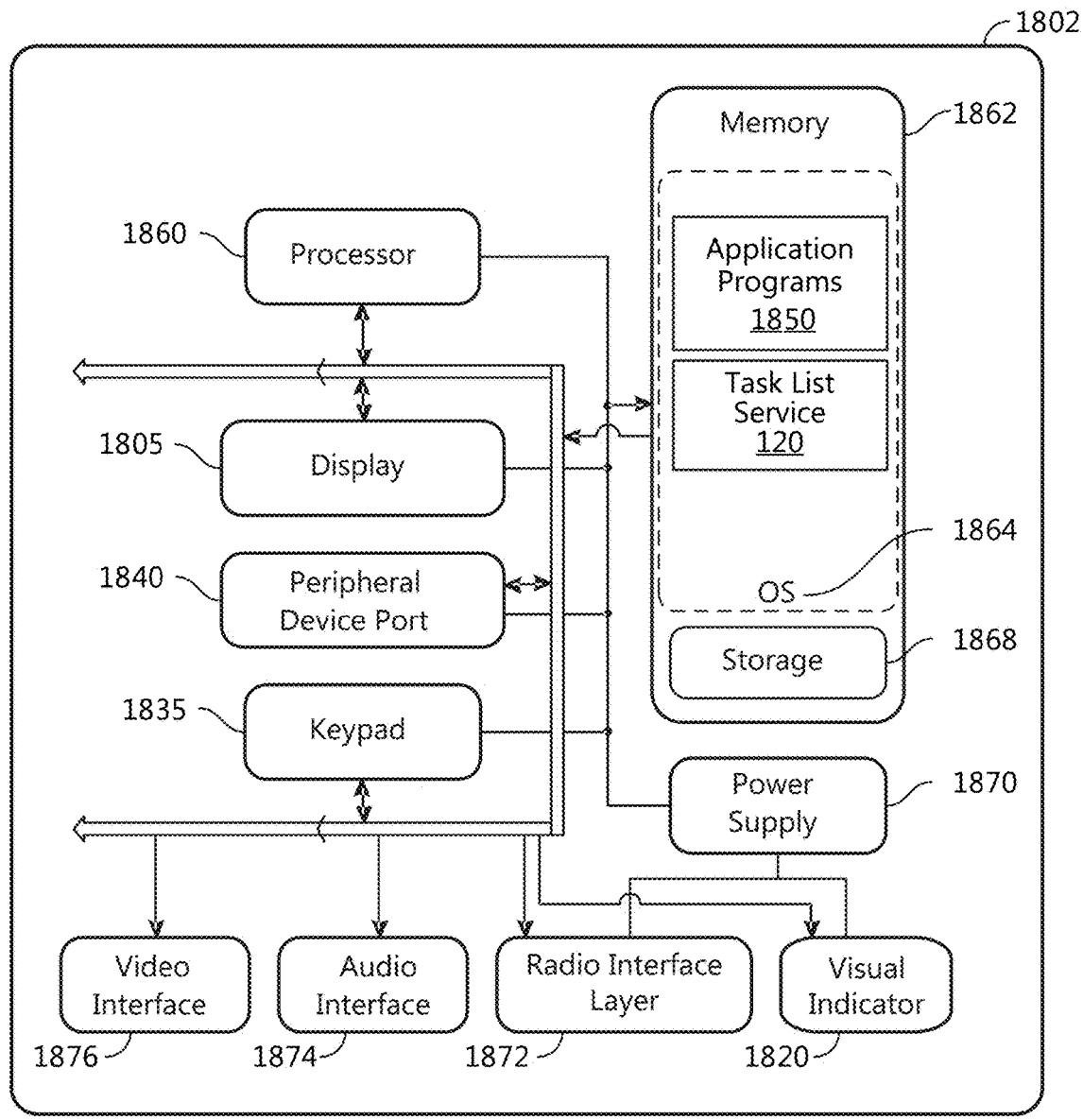
Figure 19:
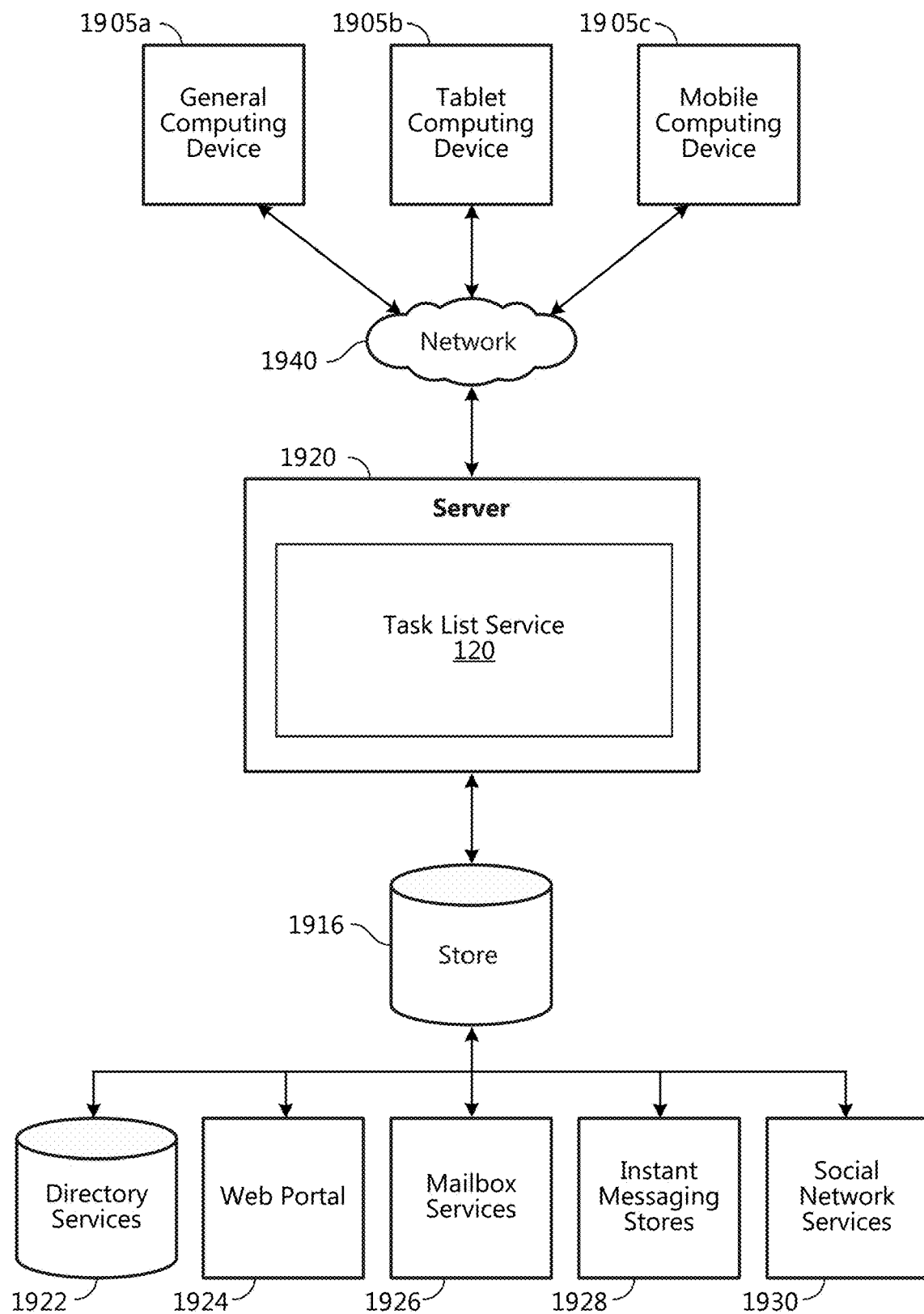
FIG. 19 is a block diagram of a distributed computing system.

FIGS. 17-19 and the associated descriptions provide a discussion of a variety of operating environments in which examples are practiced. However, the devices and systems illustrated and discussed with respect to FIGS. 17-19 are for purposes of example and illustration and are not limiting of a vast number of computing device configurations that are utilized for practicing aspects, described herein.

FIG. 17 is a block diagram illustrating physical components (i.e., hardware) of a computing device 1700 with which examples of the present disclosure may be practiced. In a basic configuration, the computing device 1700 includes at least one processing unit 1702 and a system memory 1704. According to an aspect, depending on the configuration and type of computing device, the system memory 1704 comprises, but is not limited to, volatile storage (e.g., random access memory), non-volatile storage (e.g., read-only memory), flash memory, or any combination of such memories. According to an aspect, the system memory 1704 includes an operating system 1705 and one or more program modules 1706 suitable for running software applications 1750. According to an aspect, the system memory 1704 includes the task list service 120. The operating system 1705, for example, is suitable for controlling the operation of the computing device 1700. Furthermore, aspects are practiced in conjunction with a graphics library, other operating systems, or any other application program, and are not limited to any particular application or system. This basic configuration is illustrated in FIG. 17 by those components within a dashed line 1708. According to an aspect, the computing device 1700 has additional features or functionality. For example, according to an aspect, the computing device 1700 includes additional data storage devices (removable and/or non-removable) such as, for example, magnetic disks, optical disks, or tape. Such additional storage is illustrated in FIG. 17 by a removable storage device 1709 and a non-removable storage device 1710.

As stated above, according to an aspect, a number of program modules 1706 and data files are stored in the system memory 1704. While executing on the processing unit 1702, the program modules 1706 (e.g., task list service 120) perform processes including, but not limited to, one or more of the stages of the method 1600 illustrated in FIG. 16, respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 1700 has one or more input device(s) 1712 such as a keyboard, a mouse, a pen, a sound input device, a touch input device, etc. The output device(s) 1714 such as a display, speakers, a printer, etc. are also included according to an aspect. The aforementioned devices are examples and others may be used. According to an aspect, the computing device 1700 includes one or more communication connections 1716 allowing communications with other computing devices 1718. Examples of suitable communication connections 1716 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1704, the removable storage device 1709, and the non-removable storage device 1710 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1700. According to an aspect, any such computer storage media is part of the computing device 1700. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 18A and 18B illustrate a mobile computing device 1800, for example, a mobile telephone, a smart phone, a tablet personal computer, a laptop computer, and the like, with which aspects may be practiced. With reference to FIG. 18A, an example of a mobile computing device 1800 for implementing the aspects is illustrated. In a basic configuration, the mobile computing device 1800 is a handheld computer having both input elements and output elements. The mobile computing device 1800 typically includes a display 1805 and one or more input buttons 1810 that allow the user to enter information into the mobile computing device 1800. According to an aspect, the display 1805 of the mobile computing device 1800 functions as an input device (e.g., a touch screen display). If included, an optional side input element 1815 allows further user input. According to an aspect, the side input element 1815 is a rotary switch, a button, or any other type of manual input element. In alternative examples, mobile computing device 1800 incorporates more or fewer input elements. For example, the display 1805 may not be a touch screen in some examples. In alternative examples, the mobile computing device 1800 is a portable phone system, such as a cellular phone. According to an aspect, the mobile computing device 1800 includes an optional keypad 1835. According to an aspect, the optional keypad 1835 is a physical keypad. According to another aspect, the optional keypad 1835 is a "soft" keypad generated on the touch screen display. In various aspects, the output elements include the display 1805 for showing a graphical user interface (GUI), a visual indicator 1820 (e.g., a light emitting diode), and/or an audio transducer 1825 (e.g., a speaker). In some examples, the mobile computing device 1800 incorporates a vibration transducer for providing the user with tactile feedback. In yet another example, the mobile computing device 1800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1800 incorporates peripheral device port 1840, such as an audio input (e.g., a microphone jack), an audio output (e.g., a headphone jack), and a video output (e.g., a HDMI port) for sending signals to or receiving signals from an external device.

FIG. 18B is a block diagram illustrating the architecture of one example of a mobile computing device. That is, the mobile computing device 1800 incorporates a system (i.e., an architecture) 1802 to implement some examples. In one example, the system 1802 is implemented as a "smart phone" capable of running one or more applications (e.g., browser, e-mail, calendaring, contact managers, messaging clients, games, and media clients/players). In some examples, the system 1802 is integrated as a computing device, such as an integrated personal digital assistant (PDA) and wireless phone.

According to an aspect, one or more application programs 1850 are loaded into the memory 1862 and run on or in association with the operating system 1864. Examples of the application programs include phone dialer programs, e-mail programs, personal information management (PIM) programs, word processing programs, spreadsheet programs, Internet browser programs, messaging programs, and so forth. According to an aspect, the task list service 120 is loaded into memory 1862. The system 1802 also includes a non-volatile storage area 1868 within the memory 1862. The non-volatile storage area 1868 is used to store persistent information that should not be lost if the system 1802 is powered down. The application programs 1850 may use and store information in the non-volatile storage area 1868, such as e-mail or other messages used by an e-mail application, and the like. A synchronization application (not shown) also resides on the system 1802 and is programmed to interact with a corresponding synchronization application resident on a host computer to keep the information stored in the non-volatile storage area 1868 synchronized with corresponding information stored at the host computer. As should be appreciated, other applications may be loaded into the memory 1862 and run on the mobile computing device 1800.

According to an aspect, the system 1802 has a power supply 1870, which is implemented as one or more batteries. According to an aspect, the power supply 1870 further includes an external power source, such as an AC adapter or a powered docking cradle that supplements or recharges the batteries.

According to an aspect, the system 1802 includes a radio 1872 that performs the function of transmitting and receiving radio frequency communications. The radio 1872 facilitates wireless connectivity between the system 1802 and the "outside world," via a communications carrier or service provider. Transmissions to and from the radio 1872 are conducted under control of the operating system 1864. In other words, communications received by the radio 1872 may be disseminated to the application programs 1850 via the operating system 1864, and vice versa.

According to an aspect, the visual indicator 1820 is used to provide visual notifications and/or an audio interface 1874 is used for producing audible notifications via the audio transducer 1825. In the illustrated example, the visual indicator 1820 is a light emitting diode (LED) and the audio transducer 1825 is a speaker. These devices may be directly coupled to the power supply 1870 so that when activated, they remain on for a duration dictated by the notification mechanism even though the processor 1860 and other components might shut down for conserving battery power. The LED may be programmed to remain on indefinitely until the user takes action to indicate the powered-on status of the device. The audio interface 1874 is used to provide audible signals to and receive audible signals from the user. For example, in addition to being coupled to the audio transducer 1825, the audio interface 1874 may also be coupled to a microphone to receive audible input, such as to facilitate a telephone conversation. According to an aspect, the system 1802 further includes a video interface 1876 that enables an operation of an on-board camera 1830 to record still images, video stream, and the like.

According to an aspect, a mobile computing device 1800 implementing the system 1802 has additional features or functionality. For example, the mobile computing device 1800 includes additional data storage devices (removable and/or non-removable) such as, magnetic disks, optical disks, or tape. Such additional storage is illustrated in FIG. 18B by the non-volatile storage area 1868.

According to an aspect, data/information generated or captured by the mobile computing device 1800 and stored via the system 1802 are stored locally on the mobile computing device 1800, as described above. According to another aspect, the data are stored on any number of storage media that are accessible by the device via the radio 1872 or via a wired connection between the mobile computing device 1800 and a separate computing device associated with the mobile computing device 1800, for example, a server computer in a distributed computing network, such as the Internet. As should be appreciated such data/information are accessible via the mobile computing device 1800 via the radio 1872 or via a distributed computing network. Similarly, according to an aspect, such data/information are readily transferred between computing devices for storage and use according to well-known data/information transfer and storage means, including electronic mail and collaborative data/information sharing systems.

FIG. 19 illustrates one example of the architecture of a system for improving the efficiency of managing task lists as described above. Content developed, interacted with, or edited in association with the task list service 120 is enabled to be stored in different communication channels or other storage types. For example, various documents may be stored using a directory service 1922, a web portal 1924, a mailbox service 1926, an instant messaging store 1928, or a social networking site 1930. The task list service 120 is operative to use any of these types of systems or the like for improving efficiency of task list management, as described herein. According to an aspect, a server 1920 provides the task list service 120 to clients 1905a,b,c. As one example, the server 1920 is a web server providing the task list service 120 over the web. The server 1920 provides the task list service 120 over the web to clients 1905 through a network 1940. By way of example, the client computing device is implemented and embodied in a personal computer 1905a, a tablet computing device 1905b or a mobile computing device 1905c (e.g., a smart phone), or other computing device. Any of these examples of the client computing device are operable to obtain content from the store 1916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing dynamic context for tasks to convey details and circumstances related to the task and supplementary information to augment the understanding of the task, the method comprising:
   storing in a relational store a time, a location, an application identifier and semantics associated with each of a plurality of user-interactions including at least one of a user-interaction with an application, a user-interaction with a contact, and a user-interaction with a document, the time, location, application identifier and semantics defining a context for each of the plurality of user-interactions;
   evaluating the context of the plurality of user-interactions to determine a commonality in the context;
   generating a suggested task item that is reflective of the commonality;
   causing display of the suggested task item within a user interface of a task list application;
   receiving an input, via the user-interface, to add the suggested task item to a task list of the task list application;
   responsive to receipt of the input:
      associating the suggested task item with a task-completing productivity application relevant to the suggested task item as indicated by the context;
      adding the suggested task item to the task list; and
      causing display of the suggested task item within the task list within the user interface of the task list application in association with a display of a link to the task-completing productivity application;
   receiving a selection of the link via the user interface; and
   responsive to the selection of the link, launching the task-completing productivity application enabling completion of the suggested task item.

2. The computer-implemented method of claim 1, wherein the task-completing productivity application comprises at least one of:
   a word processing application;
   an email application;
   a spreadsheet application;
   a calendar application;
   a note taking application; and
   a presentation application.

3. The computer-implemented method of claim 1, wherein the displayed task list that includes the suggested task item includes a display of a second task item along with a link to a second task-completing productivity application relevant to the second task item as indicated by the context, the second task-completing productivity application being different from the task-completing application associated with the suggested task item.

4. The computer-implemented method of claim 3, further comprising causing to display in the user interface of the task list application a user-selectable option to add a new task.

5. The method of claim 1, wherein generating the suggested task item that is reflective of the commonality includes generating a plurality of suggested task items that are reflective of the commonality and filtering the plurality of suggested task items to a subset of suggested task items, the filtering operating to remove conflicts of the plurality of suggested task items with an existing task item.

6. The method of claim 1, wherein evaluating the context of the plurality of user-interactions to determine the commonality in the context includes clustering the contexts of the plurality of user-interactions based on one or more of a common time, a common location, a common application identifier and common semantics of the contexts.

7. The method of claim 1, further comprising reporting on a completion status of the suggested task item.

8. A system for providing dynamic context for tasks to convey details and circumstances related to the task and supplementary information to augment the understanding of the task, the system comprising:
   a memory storing executable instructions and a processor executing the instructions, the processor being caused to:
      store in a relational store a time, a location, an application identifier and semantics associated with each of a plurality of user-interactions including at least one of a user-interaction with an application, a user-interaction with a contact, and a user-interaction with a document, the time, location, application identifier and semantics defining a context for each of the plurality of user-interactions;
evaluate the context of the plurality of user-interactions to determine a commonality in the context;
generate a suggested task item that is reflective of the commonality;
cause display of the suggested task item within a user interface of a task list application;
receive an input, via the user interface, to add the suggested task item to a task list of the task list application;
responsive to the received input:
associate the suggested task item with a task-completing productivity application relevant to the suggested task item as indicated by the context;
add the suggested task item to the task list; and
cause display of the suggested task item within the task list within the user interface of the task list application in association with a display of a link to the task-completing productivity application;
receive a selection of the link; and
responsive to the selection of the link, launch the task-completing productivity application enabling completion of the task.

9. The system of claim 8, wherein the task-completing productivity application comprises at least one of:
a word processing application;
an email application;
a spreadsheet application;
a calendar application;
a note taking application; and
a presentation application.

10. The system of claim 8, wherein the processor further causes display of a second task item, within the task list, along with a link to a second task-completing productivity application relevant to the second task item as indicated by the context, the second task-completing productivity application being different from the task-completing application associated with the suggested task item.

11. The system of claim 10, wherein the processor further causes display in the user interface of the task list application a user-selectable option to add a new task.

12. The system of claim 8, wherein generation of the suggested task item that is reflective of the commonality includes generation of a plurality of suggested task items that are reflective of the commonality and filtering the plurality of suggested task items to a subset of suggested task items, the filtering operating to remove conflicts of the plurality of suggested task items with an existing task item.

13. The system of claim 8, wherein evaluation of the context of the plurality of user-interactions to determine the commonality in the context includes clustering the contexts of the plurality of user-interactions based on one or more of a common time, a common location, a common application identifier and common semantics of the contexts.

14. The system of claim 8, wherein the instructions further cause the processor to report on a completion status of the suggested task item.

15. Computer storage media storing computer-executable instructions for providing dynamic context for tasks to convey details and circumstances related to the task and supplementary information to augment the understanding of the task, wherein the computer-executable instructions cause a computer to:
store in a relational store a time, a location, an application identifier and semantics associated with each of a plurality of user-interactions including at least one of a user-interaction with an application, a user-interaction with a contact, and a user-interaction with a document, the time, location, application identifier and semantics defining a context for each of the plurality of user-interactions;
evaluate the context of the plurality of user-interactions to determine a commonality in the context;
generate a suggested task item that is reflective of the context;
cause display of the suggested task item within a user interface of a task list application;
receive an input, via the user-interface, to add the suggested task item to a task list of the task list application;
responsive to the received input:
associate the suggested task item with a task-completing productivity application relevant to the suggested task item as indicated by the context;
add the suggested task item to the task list; and
cause display of the suggested task item within the task list within the user interface of the task list application in association with a display of a link to the task-completing productivity application;
receive a selection of the link; and
responsive to the selection of the link, launch the task-completing productivity application enabling completion of the task.

16. The computer storage media of claim 15, wherein the task-completing productivity application comprises at least one of:
a word processing application;
an email application;
a spreadsheet application;
a calendar application;
a note taking application; and
a presentation application.

17. The computer storage media of claim 15, wherein the computer further causes display of a second task item, within the task list, along with a link to a second task-completing productivity application relevant to the second task item as indicated by the context, the second task-completing productivity application being different from the task-completing application associated with the suggested task item.

18. The computer storage media of claim 17, wherein the computer further causes display in the user interface of the task list application a user-selectable option to add a new task.

19. The computer storage media of claim 15, wherein generation of the suggested task item that is reflective of the commonality includes generation of a plurality of suggested task items that are reflective of the commonality and filtering the plurality of suggested task items to a subset of suggested task items, the filtering operating to remove conflicts of the plurality of suggested task items with an existing task item.

20. The computer storage media of claim 15, wherein evaluation of the context of the plurality of user-interactions to determine the commonality in the context includes clustering the contexts of the plurality of user-interactions based on one or more of a common time, a common location, a common application identifier and common semantics of the contexts.

* * * * *